United States Patent
Wang et al.

(10) Patent No.: US 11,450,244 B2
(45) Date of Patent: Sep. 20, 2022

(54) DISPLAY APPARATUS AND DISPLAY SYSTEM FOR DISPLAYING LOCAL INFORMATION AND REMOTE INFORMATION

(71) Applicant: BOE TECHNOLOGY GROUP CO., LTD., Beijing (CN)

(72) Inventors: Zifeng Wang, Beijing (CN); Lei Shao, Beijing (CN); Bin Shen, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 48 days.

(21) Appl. No.: 16/986,540

(22) Filed: Aug. 6, 2020

(65) Prior Publication Data
US 2021/0043119 A1 Feb. 11, 2021

(30) Foreign Application Priority Data
Aug. 6, 2019 (CN) .......................... 201921269816.9

(51) Int. Cl.
*G09F 9/302* (2006.01)
*G09F 15/00* (2006.01)
*G09F 27/00* (2006.01)
*G06F 3/16* (2006.01)
(Continued)

(52) U.S. Cl.
CPC ............ *G09F 9/302* (2013.01); *G06F 3/1454* (2013.01); *G06F 3/165* (2013.01); *G09F 15/0012* (2013.01); *G09F 27/00* (2013.01); *F16M 11/42* (2013.01); *G09F 2027/002* (2013.01)

(58) Field of Classification Search
CPC ...... G09F 9/302; G09F 15/0012; G09F 27/00; G09F 2027/002; G06F 3/1454; G06F 3/165; F16M 11/42
See application file for complete search history.

(56) References Cited

U.S. PATENT DOCUMENTS 6,174,034 B1    1/2001  Benner et al.
6,305,764 B1 *  10/2001 Kortman ................ A47B 43/00
                                                    108/162
(Continued)

FOREIGN PATENT DOCUMENTS

CN          203336214 U     12/2013
CN          105307447 A      2/2016
(Continued)

OTHER PUBLICATIONS

International Search Report and Written Opinion dated May 7, 2020 in Internaional Application No. PCT/CN2019/121337, with English translation.
(Continued)

*Primary Examiner* — Wing H Chow
(74) *Attorney, Agent, or Firm* — McDermott Will & Emery LLP

(57) ABSTRACT

A display apparatus includes a frame, a first display screen and a second display screen. The frame includes at least one base assembly and a frame body fixed on the at least one base assembly. The first display screen and the second display screen are arranged in a first direction and fixed within the frame body. The first direction is a height direction of the frame.

16 Claims, 12 Drawing Sheets

(51) Int. Cl.
*G06F 3/14* (2006.01)
*F16M 11/42* (2006.01)

(56) References Cited

U.S. PATENT DOCUMENTS

| | | | |
|---|---|---|---|
| 9,134,950 B2 * | 9/2015 | Choi | ................... G06F 3/1446 |
| 2010/0282932 A1 * | 11/2010 | Ong | ................... H05K 7/1489 |
| | | | 211/183 |

FOREIGN PATENT DOCUMENTS

| | | |
|---|---|---|
| CN | 205383407 U | 7/2016 |
| CN | 107007052 A | 8/2017 |

OTHER PUBLICATIONS

Office Action dated Oct. 14, 2020 in Chinese Application No. 201990000201.8, with English translation.

* cited by examiner

DISPLAY APPARATUS AND DISPLAY SYSTEM FOR DISPLAYING LOCAL INFORMATION AND REMOTE INFORMATION

CROSS-REFERENCE TO RELATED APPLICATION

This application claims priority to Chinese Patent Application No. 201921269816.9, filed on Aug. 6, 2019, which is incorporated herein by reference in its entirety.

TECHNICAL FIELD

The present disclosure relates to the field of display technologies, and in particular, to a display apparatus and a display system.

BACKGROUND

Electronic display apparatuses are generally used in communicative conferences, such as business conferences, medical consultations, etc., to assist participants in better understanding the conference content.

SUMMARY

On the one hand, a display apparatus is provided, and the display apparatus includes a frame, a first display screen and a second display screen. The frame includes at least one base assembly and a frame body fixed on the at least one base assembly. The first display screen and the second display screen are arranged in the first direction and are fixed within the frame body. The first direction is a height direction of the frame.

In some embodiments, the frame body includes a connecting portion, a first frame portion and a second frame portion. The connecting portion is detachably fixed to the at least one base assembly. The first frame portion is disposed on a side of the connecting portion away from the at least one base assembly and is connected to the connecting portion, and the first display screen is disposed within the first frame portion. The second frame portion is disposed on a side of the first frame portion away from the connecting portion and is connected to the first frame portion, and the second display screen is disposed within the second frame portion.

In some embodiments, the frame body further includes a third frame portion. The third frame portion is disposed on a side of the second frame portion away from the first frame portion, and is connected to the second frame portion. The display apparatus further includes an image acquisition device and at least one audio device. The image acquisition device is disposed within the third frame portion. The at least one audio device is disposed within the first frame portion.

In some embodiments, the third frame portion and the second frame portion are detachably connected.

In some embodiments, the connecting portion includes two first vertical beams and a first horizontal beam connected to the two first vertical beams; the first frame portion includes two second vertical beams and a second horizontal beam connected to the two second vertical beams, the second frame portion includes two third vertical beams, and a third horizontal beam and a fourth horizontal beam that are each connected to the two third vertical beams; the third frame portion includes two fourth vertical beams and a fifth horizontal beam connected to the two fourth vertical beams; and the first to fifth horizontal beams are sequentially arranged along the first direction, and all first to fourth vertical beams extend in the first direction.

In some embodiments, at least one of the first to fifth horizontal beams is a first-type horizontal beam. The first-type horizontal beam includes a first horizontal beam body and at least one first functional groove. The at least one first functional groove is disposed in a surface of the first horizontal beam body facing or facing away from the at least one base assembly, and an extension direction of the at least one first functional groove is the same as an extension direction of the first horizontal beam body.

In some embodiments, the frame body further includes at least one first magnetic part and at least one first horizontal beam trim panel. Each first magnetic part is disposed in a corresponding first functional groove. The at least one first horizontal beam trim panel is disposed on the first horizontal beam body and covering the at least one first magnetic part.

In some embodiments, the at least one first functional groove includes a plurality of first functional grooves, and the plurality of first functional grooves are arranged along a direction perpendicular to the extension direction of the first horizontal beam body.

In some embodiments, at least one of the first to fifth horizontal beams is a second-type horizontal beam. The second-type horizontal beam includes a second horizontal beam body and at least one step groove. The at least one step groove is disposed in at least one visible surface of the second horizontal beam body which is parallel to display surfaces of the first display screen and the second display screen.

In some embodiments, the frame body further includes at least one second magnetic part and at least one second horizontal beam trim panel. Each second magnetic part is disposed in a corresponding step groove. The at least one second horizontal beam trim panel covers the at least one second magnetic part, and each second horizontal beam trim panel extends out of a corresponding step groove in the first direction.

In some embodiments, the second horizontal beam, the third horizontal beam and the fourth horizontal beam are second-type horizontal beams. A second horizontal beam trim panel is disposed on the second horizontal beam trim panel extends beyond the second horizontal beam in a direction pointing to the fifth horizontal beam from the first horizontal beam, and the second horizontal beam trim panel disposed on the second horizontal beam seals a gap between the second horizontal beam and both the first display screen and the at least one audio device; and/or a second horizontal beam trim panel is disposed on the third horizontal beam extends beyond the third horizontal beam in a direction pointing to the fifth horizontal beam from the first horizontal beam, and the second horizontal beam trim panel disposed on the fifth horizontal beam seals a gap between the second display screen and the third horizontal beam; and/or the second horizontal beam trim panel disposed on the third horizontal beam extends beyond the third horizontal beam in a direction pointing to the first horizontal beam from the fifth horizontal beam, and the second horizontal beam trim panel disposed on the third horizontal beam seals a gap between the fifth horizontal beam and both the first display screen and the at least one audio device; and/or a second horizontal beam trim panel is disposed on the fourth horizontal beam extends beyond the fourth horizontal beam in a direction pointing to the first horizontal beam from the fifth horizontal beam, and the second horizontal beam trim panel disposed on the fourth horizontal beam seals a gap between the second display screen and the fourth horizontal beam.

In some embodiments, at least one of all first to fourth vertical beams is a first-type vertical beam. The first-type vertical beam includes a vertical beam body and at least one second functional groove disposed in the vertical beam body. The at least one second functional groove extends in the first direction. The frame body further includes at least one third magnetic part and at least one vertical beam trim panel. Each third magnetic part is disposed in a corresponding second functional groove. The at least one vertical beam trim panel is disposed on the vertical beam body and covering the at least one third magnetic part.

In some embodiments, the at least one second functional groove includes a plurality of second functional grooves, and the plurality of second functional grooves are arranged along a direction perpendicular to the first direction.

In some embodiments, the first-type vertical beam further includes a second limit groove disposed in the vertical beam body and extending in the first direction. The second limit groove and the at least one second functional groove are connected, and the second limit groove is closer to an edge of the vertical beam body relative to the at least one second functional groove. The vertical beam trim panel is disposed in the limit groove.

In some embodiments, one of the two first vertical beams, one of the two second vertical beams, one of the two third vertical beams and one of the two fourth vertical beams are disposed at a same side of the first to fifth horizontal beams, and the first vertical beams, the second vertical beams, the third vertical beams and the fourth vertical beams are integrally formed as a first integrated vertical beam. Another of the two first vertical beams, another of the two second vertical beams, another of the two third vertical beams and another of the two fourth vertical beams are disposed at another same side of the first to fifth horizontal beams, and the first vertical beams, the second vertical beams, the third vertical beams and the fourth vertical beams are integrally formed as a second integrated vertical beam. Opposite ends of each of the first to fifth horizontal beams are fixed on the first integrated vertical beam and the second integrated vertical beam.

In some embodiments, one of the two fourth vertical beams disposed at a same side of the first to fifth horizontal beams is a first sub-vertical beam: one of the two first vertical beams, one of the two second vertical beams and one of the two third vertical beams disposed at the same side of the first to fifth horizontal beams are integrally formed as a second sub-vertical beam. Another of the two fourth vertical beams disposed at another same side of the first to fifth horizontal beams is a third sub-vertical beam. Another of the two first vertical beams, another of the two second vertical beams and another of the two third vertical beams disposed at the another same side of the first to fifth horizontal beams are integrally formed as a fourth integrated vertical beam. The first sub-vertical beam is detachably connected to the second sub-vertical beam, and the third sub-vertical beam is detachably connected to the fourth sub-vertical beam. The first to fifth horizontal beams are aluminum extruded horizontal beams, and all first to fourth vertical beams are aluminum extruded vertical beams.

In some embodiments, the at least one audio device includes at least one audio player and at least one audio collector. The display apparatus further includes a transceiver, a memory, and a processor. The transceiver is configured to receive remote information sent by an external apparatus and transmit local information to the external apparatus, wherein the remote information includes at least one of remote image information, remote text information, and remote audio information. The processor is connected to the transceiver, the memory, the at least one audio device, the first display screen and the second display screen, and the processor is configured to perform at least one of: controlling the second display screen to display the remote image information and the remote text information; controlling the at least one audio player in the at least one audio device to play the remote audio information; storing local image information acquired by the image acquisition device and local audio information acquired by the at least one audio collector in the at least one audio device as local information in the memory; and transmitting the local information to the transceiver.

In some embodiments, the display apparatus further includes at least one first interface, at least one second interface, and at least one button. The at least one first interface is disposed on at least one of the first to fifth horizontal beams. The at least one second interface is disposed on at least one of all first to fourth vertical beams. The at least one button is disposed on at least one of all the first to fourth vertical beams.

In some embodiments, the display apparatus further includes a second cover plate, a third cover plate, and at least one third interface. The second cover plate is disposed on a back of the first display screen and fixed on the frame. The third cover plate is disposed on a back of the second display screen and fixed on the frame. The at least one third interface is disposed on the third cover plate.

On the other hand, a display system is provided. The display system includes at least two display apparatuses in any of the embodiments described above, and the at least two display apparatuses are configured to communicate with each other.

BRIEF DESCRIPTION OF THE DRAWINGS

In order to describe technical solutions in embodiments of the present disclosure more clearly, the accompanying drawings to be used in some embodiments of the present disclosure will be introduced briefly. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual dimensions of products, actual processes of methods and actual timings of signals to which the embodiments of the present disclosure relate.

The accompanying drawings illustrated herein are used for providing a further understanding of the present disclosure and form a part of the present disclosure. The exemplary embodiments of the present disclosure and descriptions thereof are used for explaining the present disclosure, instead of forming improper limitation thereto. In the accompanying drawings.

DETAILED DESCRIPTION

Figure 1:
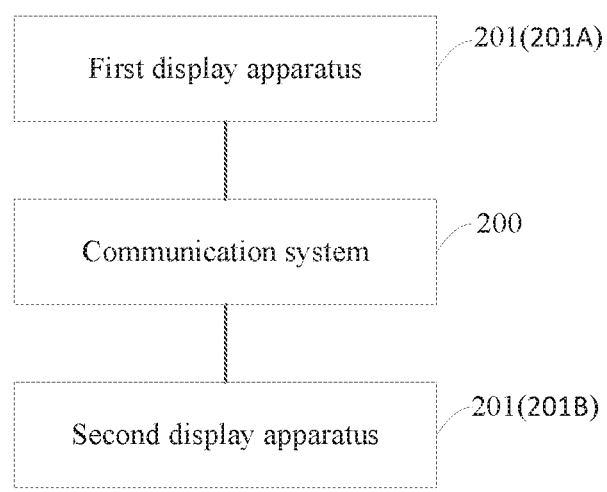
FIG. 1 is a block diagram of a display system, in accordance with some embodiments.

The technical solutions in some embodiments of the present disclosure will be described clearly and completely with reference to the accompanying drawings. However, the described embodiments are merely some but not all embodiments of the present disclosure. All other embodiments obtained on a basis of embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "included, but not limited to". In the description, terms such as "one embodiment", "some embodiments", "exemplary embodiments", "example", "some examples", or "specific example" are intended to indicate that specific features, structures, materials or characteristics related to the embodiment(s) or the example(s) are included in at least one embodiment or example of the present disclosure. Schematic representations of the above terms do not necessarily refer to the same embodiment(s) or example(s). In addition, the specific features, structures, materials or characteristics may be included in any one or more embodiments/examples in any suitable manner.

Words such as "first" and "second" are only used for descriptive purposes, and are not to be construed as indicating or implying the relative importance or implicitly indicating the number of indicated technical features below. Thus, features defined by the words "first" and "second" may explicitly or implicitly include one or more of the features. In the description of the embodiments of the present disclosure, both the terms "a plurality of" and "the plurality of" mean two or more unless otherwise specified.

In the description of the present disclosure, the terms "horizontal," "vertical," "length," "width," "thickness," "front," "back," "left," "right," "top," "bottom," or the like are based on the orientation or positional relationship shown in the drawings. They are used merely for convenience of description and simplifying the description of the present invention, but not to indicate or imply that the indicated apparatus or element must have a specific orientation, or be constructed and operated in a specific orientation, therefore cannot be construed as a limitation of the present disclosure.

It will be understood that, when it is described that an element is "connected" to another element, the element may be directly coupled or directly connected to the other element or coupled or connected to the other element through a third element. On the contrary, it will be understood that when an element is referred to as being "directly connected to" another element, another element does not intervene therebetween. Other expressions which describe the relationship between assemblies, that is, "between" and "directly between", or "adjacent to" and "directly adjacent to" need to be interpreted by the same manner.

The expression "A and/or B" includes the following three combinations: only A, only B, and a combination of A and B. The expression "at least one of A, B and C" includes the following combinations: only A, only B, only C, a combination of A and B, a combination of A and C, a combination of B and C, and a combination of A, B and C.

The use of "applicable to" or "configured to" means an open and inclusive language, which does not exclude apparatuses that are applicable to or configured to perform additional tasks or steps.

Exemplary embodiments are described herein with reference to cross-sectional views and/or plan views as idealized exemplary drawings. Accordingly, variations from the shapes of the illustrations as a result, for example, of manufacturing techniques and/or tolerances, are to be expected. Thus, embodiments described herein should not be construed as being limited to the particular shapes of regions as illustrated herein but are to include deviations in shape that result, for example, manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The communicative conferences, such as business conferences, medical consultations, etc., are held at fixed locations, and people who attend the conference at the conference location can interact with other participants directly. However, for people who cannot attend the conference, they can only interact with the participants through communication apparatuses such as telephones for sending calls, texting messages, etc., which may not only reduce the interactivity of the conference, but also influence the efficiency of the conference.

FIG. 1 shows a block diagram of a display system 10, in accordance with some embodiments. The display system 10 can be applied to scenes such as business conferences, family gatherings, and medical consultations.

As shown in FIG. 1, the display system 10 includes at least two display apparatuses 201, i.e., two or more display apparatuses 201. The at least two display apparatuses 201 are configured to communicate with each other through a wired network or a wireless network. For example, the at least two display apparatuses 201 include a first display apparatus 201A and a second display apparatus 201B. The first display apparatus 201A and the second display apparatus 201B can communicate with each other through a wired network or a wireless network. It will be noted that, although FIG. 1 only shows the first display apparatus 201A and the second display apparatus 201B, the number of display apparatuses 201 in the display system 10 may be three or even more.

The display apparatus 201 can simultaneously display local information and remote information that is sent by at least one other display apparatus 201. The local information includes at least one of local image information, local text information or local audio information, and the remote information includes at least one of remote image information, remote text information or remote audio information.

In addition, as for a display apparatus 201, the remote information is information transmitted to the display apparatus 201 by at least one other display apparatus 201, and the local information is information obtained by performing local operations by the display apparatus 201. The display apparatus 201 can perform the local operations independently without interacting with at least one other display apparatus 201. For example, the local operations include: collecting relevant information by a detection device in the display apparatus 201, and storing the collected information in at least one storage medium, such as a memory or a register, of the display apparatus 201. For another example, the local operations include: receiving information from an information input apparatus (e.g., a keyboard) connected to the display apparatus 201, and storing the information in at least one storage medium of the display apparatus 201. For yet another example, the local operations include: receiving information from other storage media (e.g., U-disks and magnetic disks), and storing the received information in at least one storage medium of the display apparatus 201. It will be noted that, the local information are only available to local participants (i.e., participants attending the conference), and it may include at least one of reminder information, warning information, or remark information.

It will be understood that the local information and the remote information are relative concepts. For example, if the first display apparatus 201A transmits information to the second display apparatus 201B, the information is local information for the first display apparatus 201A and is remote information for the second display apparatus 201B. Conversely, if the second display apparatus 201B transmits information to the first display apparatus 201A, the information is local information for the second display apparatus 201B and is remote information for the first display apparatus 201A. Similarly, local participants and remote participants (mentioned later) are also relative concepts. For example, for the participants attending the conference through the first display apparatus 201A, the participants attending the conference through the second display apparatus 201B are remote participants.

In some embodiments, as shown in FIG. 1, the display system 10 further includes a communication system 200. The at least two display apparatuses 201 may communicate with each other through the communication system 200. That is, the communication system 200 may support communication between the at least two display apparatuses 201. The communication system 200 may be a wireless communication system or a wired communication system. The wireless communication system can realize communication between the at least two display apparatuses 201 by means of electromagnetic wave propagation in free space. The wired communication system can realize communication between the at least two display apparatuses 201 by means of transmission in a guided medium.

The communication system 200 includes a transmission apparatus. For example, the transmission apparatus in the wireless communication system may include optical fibers, and the transmission apparatus in the wired communication system may include wireless base stations. The first display apparatus 201A and the second display apparatus 201B may communicate with the transmission apparatus by means of respective external or built-in transceivers. For example, a built-in transceiver of the first display apparatus 201A receives the remote information that is sent by the second display apparatus 201B and transmitted through the transmission apparatus, and the first display apparatus 201A displays the remote information. In addition, the first display apparatus 201A transmits the stored local information to the second display apparatus 201B through the built-in transceiver of the first display apparatus 201A, and then the information is received by another built-in transceiver of the second display apparatus 201.

Figure 2:
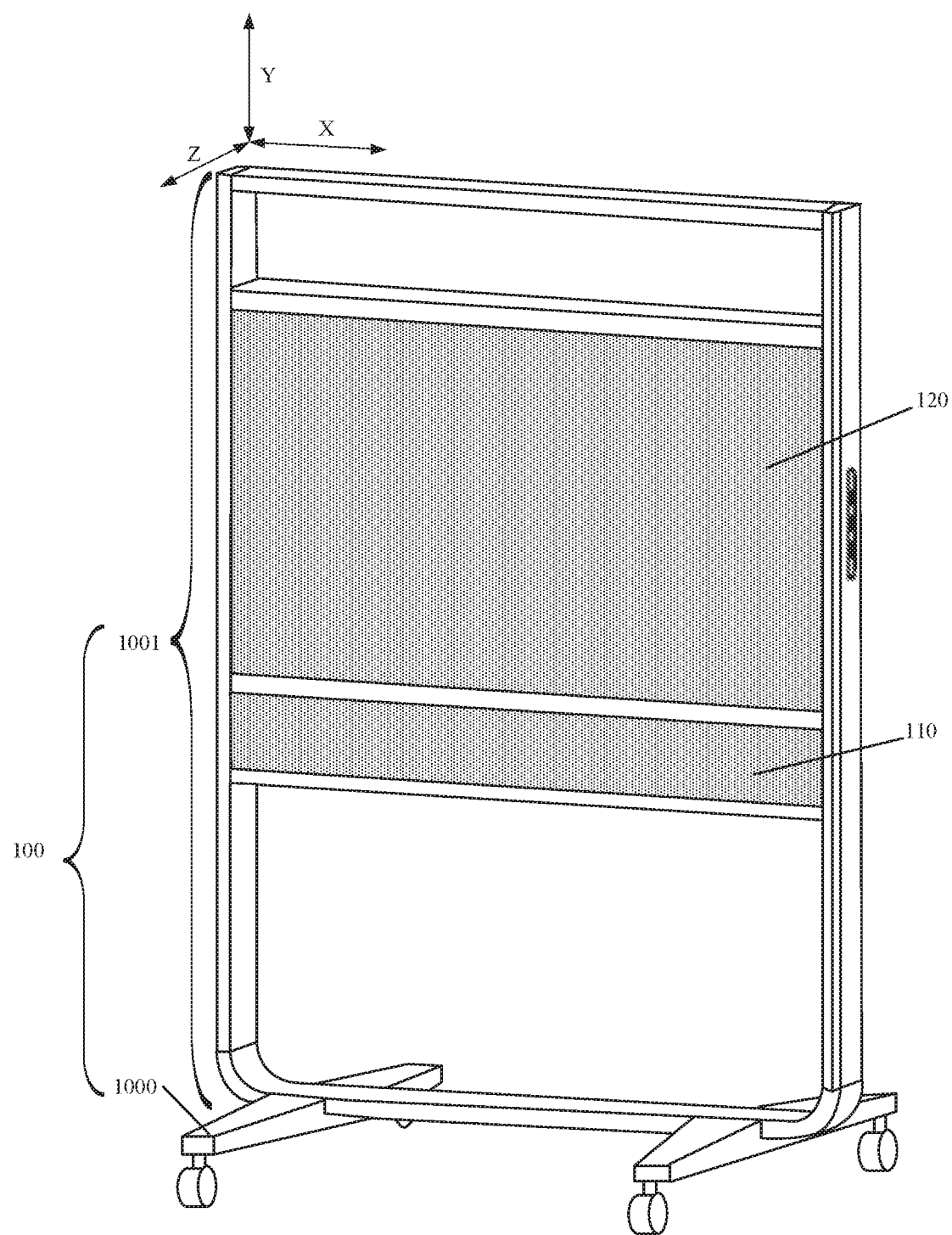
FIG. 2 is a structural diagram of a display apparatus, in accordance with some embodiments.
Figure 15:
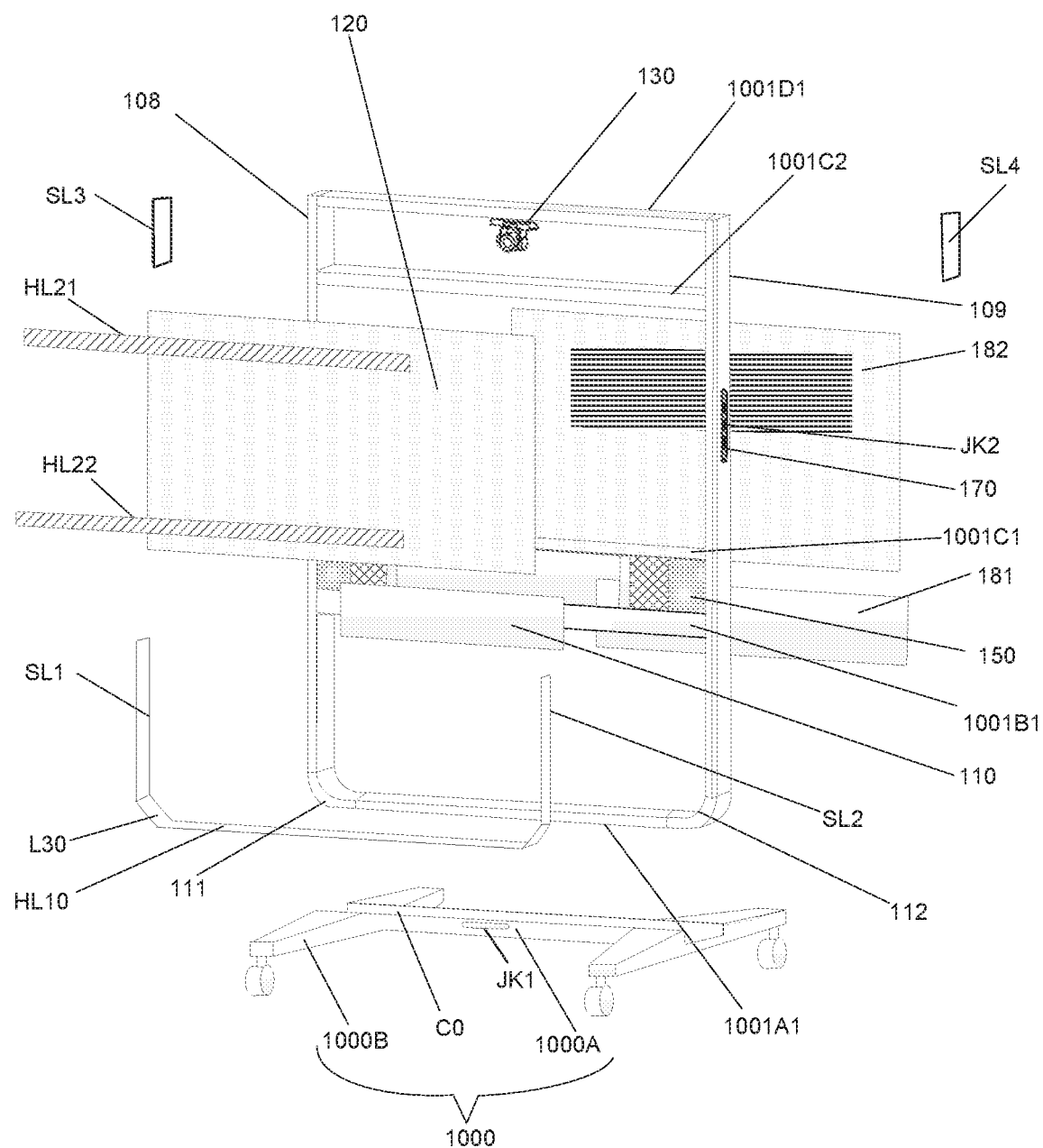
FIG. 15 is an exploded view of a display apparatus, in accordance with some embodiments.

In some embodiments, as shown in FIG. 2, the display apparatus 201 includes a frame 100, a first display screen 110 and a second display screen 120. As shown in FIGS. 2 and 15, the frame 100 includes at least one base assembly 1000 and a frame body 1001 fixed on the at least one base assembly 1000. The first display screen 110 and the second display screen 120 are fixed within the frame body 1001, and are arranged in a first direction Y. The first direction Y is the height direction of the frame 100.

Display surfaces of the first display screen 110 and the second display screen 120 may be disposed in a same plane, and the plane is referred to as a display surface of the display apparatus 201.

For example, the first display screen 110 and the second display screen 120 are arranged within the frame 100 along a direction from the bottom of the frame 100 to top of it. In this case, the second display screen 120 may be configured as a main display screen.

In order to facilitate understanding of the display apparatus 201 in the embodiments of the present disclosure, the operation of the display apparatus 201 is described below by taking an example where the application scene of the display apparatus 201 is a business conference and the display apparatus 201 is the first display apparatus 201A. For example, when relevant information needs to be displayed for the local participants, the first display apparatus 201A receives information from the information input apparatus connected to the first display apparatus 201A, and the information, which is defined as local information, is displayed on the first display screen 110. In addition, the first display screen 110 may also display information about the local participants, for example, live video of the local participants. The second display screen 120 may be configured to display remote information sent by at least one other display apparatus 201. For example, the transceiver in the first display apparatus 201A receives information (i.e., the remote information) send by the second display apparatus 201B, and the second display screen 120 displays the remote information.

Since the second display screen 120 can display remote information (such as remote conference images), and the first display screen 110 can display local information (such as reminder information), the display apparatus 201 may display local information and the remote information simultaneously, so as to make the function of the display apparatus 201 diversified. In addition, the first display screen 110 and the second display screen 120 are arranged within the frame body 1001 along the height direction of the frame 100, and the second display screen 120 is relatively higher than the first display screen 110, so that the remote information displayed on the second display screen 120 may be seen by a large number of participants, so as to make the local participants know the content of the remote conference timely and interact with the remote participants in real time.

It will be seen from the above that the display apparatus 201 provided by the embodiments of the present disclosure may satisfy the demand of local participants to interact with remote participants. Compared with traditional communication means such as the telephone, the display apparatus 201 makes the communication between participants at different conference locations more convenient and efficient, that is, the display apparatus 201 may improve the interactivity and efficiency of the conference.

In some embodiments, the frame 100 may be a fixed frame or a movable frame. For example, when the base assembly 1000 is a movable base assembly, the frame 100 is the movable frame.

In this case, since the first display screen 110 and the second display screen 120 are fixed within the frame body 1001 of the frame 100, the display apparatus 201 has strong mobility and may be moved freely according to actual needs. In addition, in the display apparatus 201, due to the arrangement of the frame 100 of the display apparatus 201, the display apparatus 201 may move freely and is not limited to a certain fixed location, which may make the application of the display apparatus 201 wider; on the other hand, since the first display screen 110 and the second display screen 120 are provided separately, the two display screens may be used to display different information.

In some embodiments, an area of the display surface of the second display screen 120 is greater than an area of the display surface of the first display screen 110. In this way, it may be easier for local participants to view the remote information displayed on the second display screen 120.

In some examples, the first display screen 110 and the second display screen 120 are both in a shape of a rectangle, and width directions of the first display screen 110 and the second display screen 120 and the height direction of the movable frame 10 are the same (i.e., the first direction Y shown in FIG. 2). It will be understood that, depending on actual situations, the first display screen 110 and the second display screen 120 may also be designed in other shapes, as long as the first display screen 110 and the second display screen 120 can be fixed within the frame body 1001 of the frame 100.

In some embodiments, the first display screen 110 and the second display screen 120 are light-emitting diode (LED) display screens, organic light-emitting diode (OLED) display screens or liquid crystal display (LCD). Of course, other type of display screens may also be used as the first display screen 110 and the second display screen 120 according to actual situations.

Figure 3:
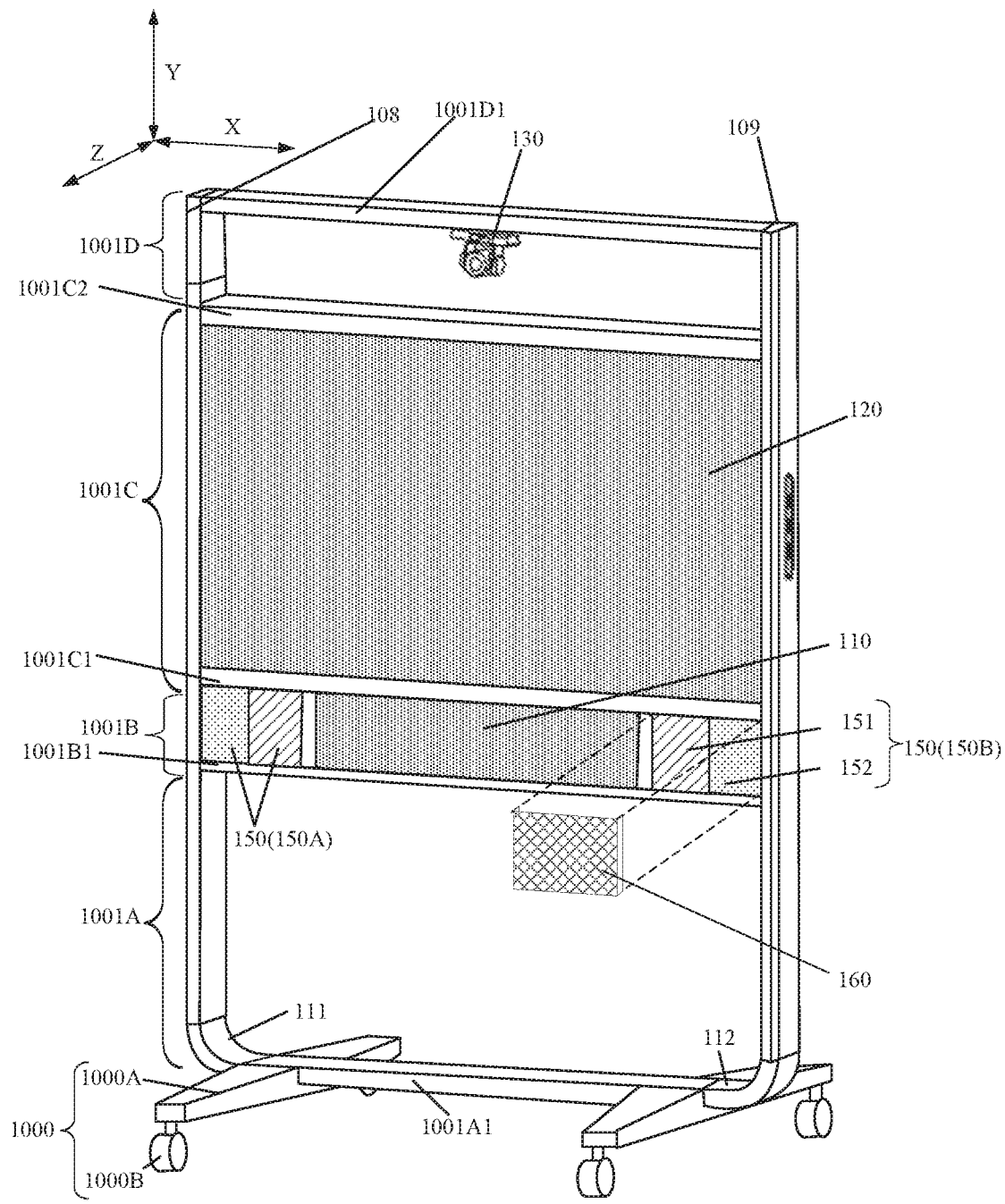
FIG. 3 is a structural diagram of another display apparatus, in accordance with some embodiments.

In some embodiments, as shown in FIG. 3, the at least one movable base assembly 1000 includes two movable base assemblies 1000, and each movable base assembly 1000 includes a base 1000A and a plurality of universal wheels 1000E (e.g., two universal wheels) disposed at the bottom of the base 1000A. The frame body 1001 may be detachably fixed on the base 1000A. When a pushing force is applied to the display apparatus 201 the universal wheels 1000B of the movable base assembly 1000 may drive the display apparatus 201 to move. For example, the base 1000A is in a shape of a bar.

In some other embodiments, the at least one movable base assembly 1000 includes one (as shown in FIG. 15) or more than two movable base assemblies 1000, and each movable base assembly 1000 may include a base 1000A and a plurality of universal wheels 1000B (e.g., four universal wheels) disposed at the bottom of the base 1000A. The frame body 1001 may be detachably fixed on the base 1000A. When a pushing force is applied to the display apparatus 201, the universal wheels 1000E of the movable base assembly 1000 may drive the display apparatus 201 to move. For example, the base 1000A is a cross-shaped base.

It will be noted that a structure of the base 1000A is not limited, as long as the frame body 1001 can be supported and fixed by the base 1000A.

The frame body 1001 is used to carry the first display screen 110 and the second display screen 120. The frame body 1001 has a plurality of accommodation spaces, and the first display screen 110 and the second display screen 120 are located in respective accommodation spaces.

Figure 4:
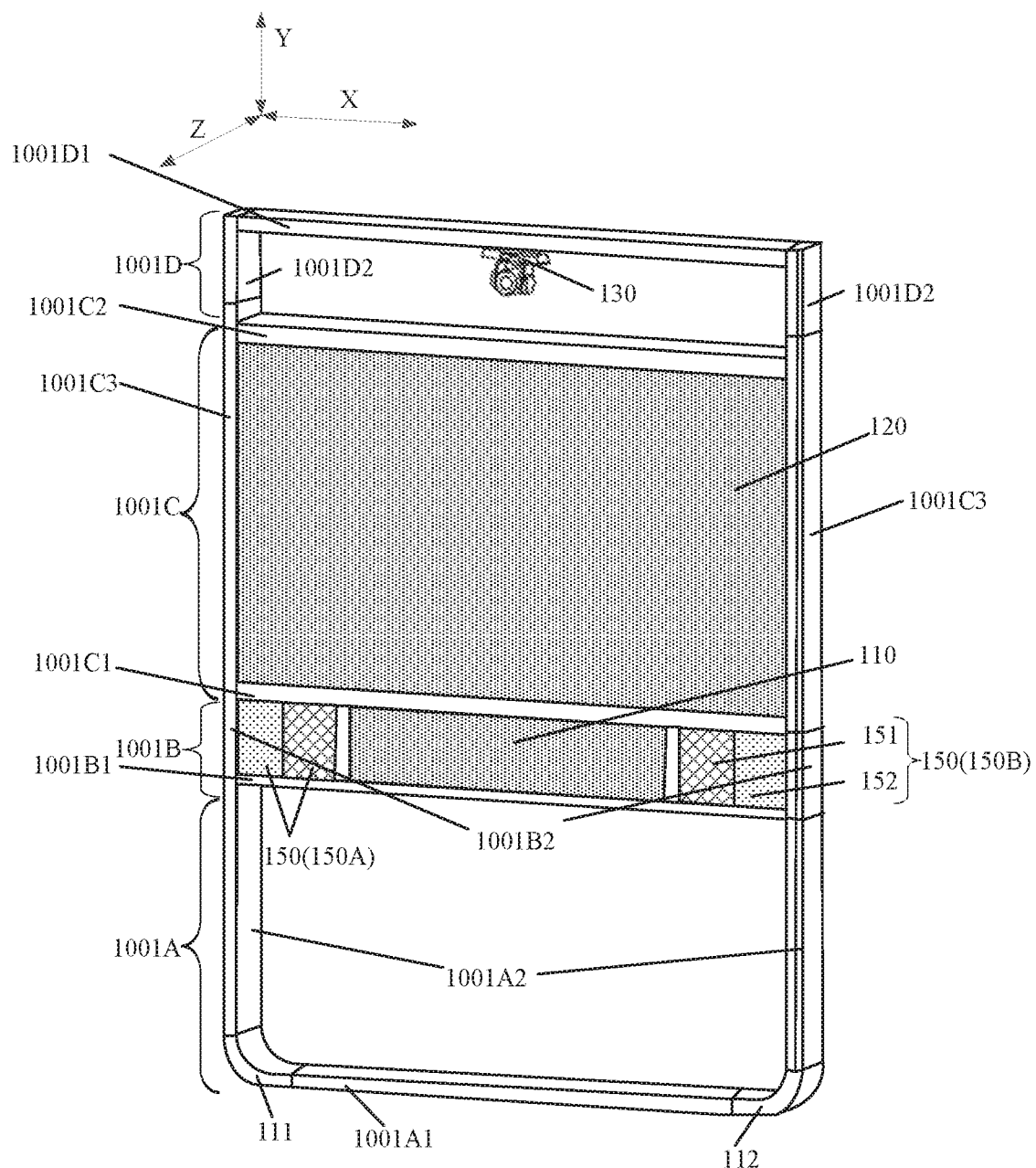
FIG. 4 is a structural diagram of a frame body of a display apparatus, in accordance with some embodiments.
Figure 5:
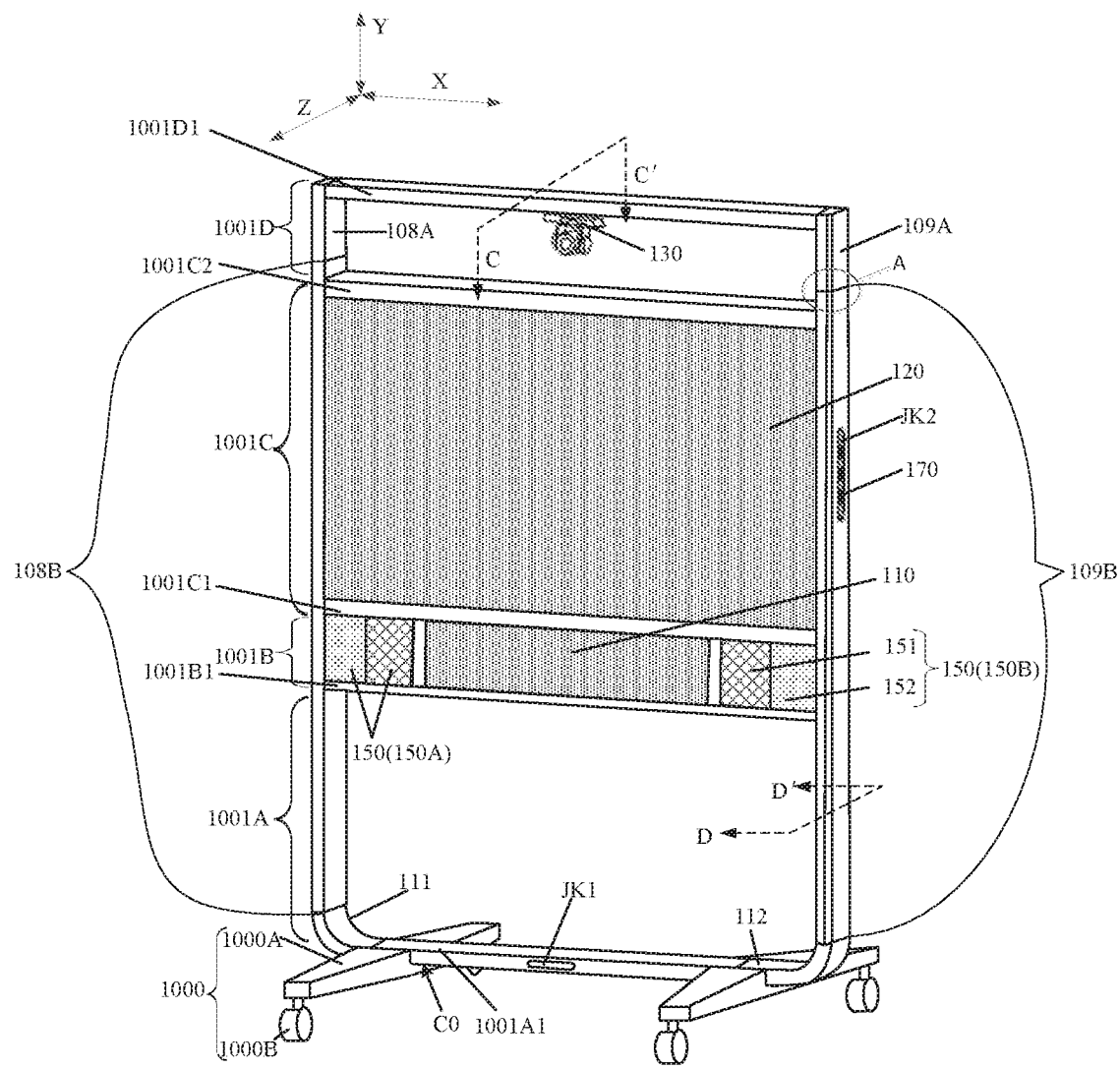
FIG. 5 is a structural diagram of yet another display apparatus, in accordance with some embodiments.

In some embodiments, as shown in FIGS. 3 to 5, the frame body 1001 includes a connecting portion 1001A, a first frame portion 1001B, and a second frame portion 1001C. The connecting portion 1001A is connected to the at least one base assembly 1000. The first frame portion 1001B is disposed on a side of the connecting portion 1001A away from the base assembly 1000 and is connected to the connecting portion 1001A. The second frame portion 1001C is disposed on a side of the first frame portion 1001B away from the connecting portion 1001A and is connected to the first frame portion 1001B. The first display screen 110 is disposed within the first frame portion 1001B. The second display screen 120 is disposed within the second frame portion 1001C.

That is, the base assembly 1000, the connecting portion 1001A, the first frame portion 1001B, and the second frame portion 1001C are sequentially arranged along the first direction Y.

In some examples, at least two adjacent members of the base 1000A, the connecting portion 1001A, the first frame portion 1001B and the second frame portion 1001C are connected in a detachable manner. In some other examples, the base 1000A, the connecting portion 1001A, the first frame portion 1001B and the second frame portion 1001C are integrally formed.

The second frame portion 1001C is used for supporting and fixing the second display screen 120, and the first frame portion 1001B is used for supporting and fixing the first display screen 110. The connecting portion 1001A is disposed between the base assembly 1000 and the first frame portion 1001B, and the first frame portion 1001B and the second frame portion 1001C may be located at respective appropriate heights by designing the connecting portion 1001A.

In this way, on the one hand, the second display screen 120 may be used as a main display screen, and is disposed within the second frame portion 1001C to ensure that the second display screen 120 is as level as possible with the user's gaze when displaying remote information. On the other hand, the first display screen 110 is disposed within the first frame portion 1001B, so as to avoid that the position of the first display screen 110 is too low to interfere the presentation of the local information displayed on the first display screen 110.

In some embodiments, as shown in FIGS. 3 to 5, the display apparatus 201 further includes an image acquisition device 130 and at least one audio device 150. The frame body 1001 further includes a third frame portion 1001D. The third frame portion 1001D is disposed on a side of the second frame portion 1001C away from the first frame portion 1001B, and is connected to the second frame portion 1001C. The image acquisition device 130 is disposed within the third frame portion 1001D. The at least one audio device 150 is disposed within the first frame portion 1001B.

For example, as shown in FIGS. 3 to 5, the at least one audio device 150 includes two audio devices 150 (e.g., a first audio device 150A and a second audio device 150B), and the second display screen 120 is disposed between the first audio device 150A and the second audio device 150B, and the first audio device 150A, the second display screen 120 and the second audio device 150B are arranged along a width direction of the frame 100 (perpendicular to the height direction of the frame 100, i.e., the first direction Y), and the width direction of the frame 100 is also called the second direction X. It will be noted that the direction perpendicular to both the first direction X and the second direction Y is defined as the third direction Z, as shown in FIGS. 3 to 5.

The number of the at least one audio device 150 and the arrangement of the at least one audio device 150 and the first display screen 110 within the first frame portion 1001B may be reasonably set according to the structure of the frame 100, which is not limited thereto.

Since the position of the third frame portion 1001D is relatively high from the ground, by providing the image acquisition device 130 within the third frame portion 1001D, the image acquisition device 130 may acquire image information of the environment where the image acquisition device 130 is located widely, so that the content of local image information acquired by the image acquisition device 130 is as rich as possible. In addition, since the first display screen 110 is mainly used to display local information, a display screen with a small size may be used as the first display screen 110, so that the at least one audio device 150 can be arranged within the first frame portion 1001B together with the first display screen 110.

For example, the image acquisition device 130 may be an image sensor or a camera. The image sensor may be a charge coupled device (CCD) image sensor. The camera may be a black-and-white camera, an infrared camera, or any other cameras having the function of acquiring image.

In some examples, as shown in FIGS. 3 to 5, the audio device 150 includes an audio player 151 and an audio collector 152. For example, the audio player 151 may be a speaker, and the audio collector 152 may be a microphone.

In some embodiments, as shown in FIG. 3, the display apparatus 201 further includes at least one first cover plate 160 with a mesh structure. The first cover plate 160 is detachably fixed to the first frame portion 1001B of the frame body 1001. The first cover plate 160 is arranged on a front side of a corresponding audio device 150, and is used to fixing the corresponding audio device 150 within the first frame portion 1001B. The first cover plate 160 and the first display screen 110 do not overlap. The audio device 150 is disposed within an area defined by the first cover plate 160 and the first frame portion 1001B. The first cover plate 160 with the mesh structure does not block the propagation of the sound played by the audio player 151 and does not affect the sound collection of the audio collector 152. In addition, the first cover plate 160 with the mesh structure can not only play a decorative role, but also filter dust and prevent dust from entering the audio player 151 and the audio collector 152.

In some embodiments, as shown in FIG. 5, the third frame portion 1001D and the second frame portion 1001C are detachably connected. For example, the connection position is the position indicated by A in FIG. 5. In this way, it may be easier to install the image acquisition device 130 onto the third frame portion 1001D, and the image acquisition device 130 may be replaced as needed.

For example, when the image acquisition device 130 is needed to be in a higher position in the display apparatus 201, the process of replacing the third frame portion 1001D includes: removing the third frame portion 1001D from the second frame portion 1001C, installing the image acquisition device 130 onto another new third frame portion 1001D (called a new third frame portion 1001D) with a higher position (matching with the height requirement of the image acquisition device), and assembling the new third frame portion 1001D on the second frame portion 1001C. In this way, the image acquisition device 130 with a different height can be used for the display apparatus 201 by disassembling the third frame portion 1001D.

It will be noted that structures of the third frame portion 1001D, the second frame portion 1001C, the first frame portion 1001B and the connecting portion 1001A may be set according to actual situations, which are described herein by some possible implementations.

In some embodiments, as shown in FIG. 4, the connecting portion 1001A includes a first horizontal beam 1001A1, and two first vertical beams 1001A2 connected to the first horizontal beam 1001A1. The first frame portion 1001B includes a second horizontal beam 1001B1, and two second vertical beams 1001B2 connected to the second horizontal beam 1001B1. The second frame portion 1001C includes a third horizontal beam 1001C1, a fourth horizontal beam 1001C2, and two third vertical beams 1001C3 each connected to the third horizontal beam 1001C1 and the fourth horizontal beam 1001C2. The third frame portion 1001D includes a fifth horizontal beam 1001C1, and at least two fourth vertical beams 1001C2 connected to the fifth horizontal beam 1001C1. The first horizontal beam 1001A1, the second horizontal beam 1001B1, the third horizontal beam 1001C1, the fourth horizontal beam 1001C2, and the fifth horizontal beam 1001C1 are arranged along the first direction Y, and are all extend in the second direction X. The first to fourth vertical beams are used for fixing these horizontal beams.

For example, as shown in FIG. 4, the first horizontal beam 1001A1 is fixed on the base 1000A of the base assembly 1000. The first horizontal beam 1001A1 and the two vertical beams 1001A2 constitute the connecting portion 1001A for connecting the at least one base assembly 1000 and the first frame portion 1001B. The second horizontal beam 1001B1 and the two vertical beams 1001B2 constitute the first frame portion 1001B for receiving the first display screen 110 and the at least one audio device 150. The third horizontal beam 1001C1, the fourth horizontal beam 1001C2, and the two vertical beams 1001C3 constitute the second frame portion 1001C for receiving the second display screen. The fifth horizontal beam 1001C1 and the two vertical beams 1001C2 constitute the third frame portion 1001D for supporting the image acquisition device 130.

It will be understood that, the distance between the third horizontal beam 1001C1 and the fourth horizontal beam 1001C2 depends on the width of the second display screen 120, the distance between the second horizontal beam 1001B1 and the third horizontal beam 1001C1 depends on the widths of the first display screen 110 and the at least one audio device 150, the distance between the first horizontal beam 1001A1 and the second horizontal beam 1001B1 depends on the heights of the first display screen 110 and the second display screen 120, which are set according to actual needs.

As shown in FIG. 4, the image acquisition device 130 may be suspended on or embedded in the fifth horizontal beam 1001C1.

In some embodiments, as shown in FIG. 5, the first horizontal beam 1001A1 is embedded in the base 1000A, so that it may be easy to assemble the base assembly 1000 and the frame body 1001.

For example, as shown in FIG. 5, the at least one base assembly 1000 includes two moveable base assemblies 1000, and each base 1000A in the two moveable base assemblies 1000 is a bar-shaped base having a positioning groove C0, and the first horizontal beam 1001A1 is embedded in the positioning groove C0.

In order to reduce the usage of material and the weight of the frame body 1001, each of the first to fifth horizontal beams is an aluminum extruded horizontal beam. Each of the first to fourth vertical beams is an aluminum extruded vertical beam. Both the aluminum extruded horizontal beam and the aluminum extruded vertical beam may be manufactured by using an aluminum extrusion die.

In some embodiments, as shown in FIGS. 3 and 4, one first vertical beam 1001A2, one second vertical beam 1001B2, one third vertical beam 1001C3 and one fourth vertical beam 1001C2 that are at a same side of the first to fifth horizontal beams are integrally formed as a first integrated vertical beam 108. Another first vertical beam 1001A2, another second vertical beam 1001B2, another third vertical beam 1001C3 and another fourth vertical beam 1001D2 that are at another same side of the first to fifth horizontal beams are integrally formed as a second integrated vertical beam 109. One end of each of the first to fifth horizontal beams is fixed onto the first integrated vertical beam 108, and the other end of thereof is fixed onto the second integrated vertical beam 109.

For example, a first end of the first horizontal beam 1001A1, a first end of the second horizontal beam 1001B1, a first end of the third horizontal beam 1001C1, a first end of the fourth horizontal beam 1001C2, and a first end of the fifth horizontal beam 1001C1 are connected to a same side of the first integrated vertical beam 108. A second end of the first horizontal beam 1001A1, a second end of the second horizontal beam 1001B1, a second end of the third horizontal beam 1001C1, a second end of the fourth horizontal beam 1001C2, and a second end of the fifth horizontal beam 1001C1 are connected to a same side of the second integrated vertical beam 109.

In some examples, as shown in FIG. 3, the frame body 1001 further includes a first arc connector 111 and a second arc connector 112. The first integrated vertical beam 108 is connected to the first end of the first horizontal beam 1001A1 through the first arc connector 111, and the first integrated vertical beam 108 is detachably connected to the first arc connector 111. The second integrated vertical beam 109 is connected to the second end of the first horizontal beam 1001A1 through the second arc connector 112, and the second integrated vertical beam 109 is detachably connected to the second arc connector 112.

In some other embodiments, every two adjacent vertical beams of one first vertical beam 1001A2, one second vertical beam 1001B2, one third vertical beam 1001C3 and one fourth vertical beam 1001D2 that are at a same side of the first to fifth horizontal beams may be detachably connected. Every two adjacent vertical beams of another first vertical beam 1001A2, another second vertical beam 1001B2, another third vertical beam 1001C3 and another fourth vertical beam 1001C2 that are at another same side of the first to fifth horizontal beams may be detachably connected.

It will be noted that, the connection of two adjacent vertical beams may be a plug-in connection, that is, an end of one of the vertical beam has a groove, and an end of the other vertical beam has a projection that can be inserted into the groove. The two adjacent vertical beams can be also connected in other manners, such as using one or more fasteners (such as screws or other fasteners); a snap fit, a friction fit, and/or an interference fit; one or more adhesives; or any other suitable means.

In this way, the display apparatus 201 may be more easily assembled by setting the vertical beams being detachably connected. Moreover, when the devices in the display apparatus 201, i.e., the first display screen 110, the second display screen 120, the image acquisition device 130, and the audio device 150, need to be replaced with new devices in different specifications, the replacement may be realized by replacing at least one vertical beam, and thus devices in different sizes may be applied in the frame 100.

In some examples, as shown in FIG. 4, the frame body 1001 further includes a first arc connector 111 and a second arc connector 112. One first vertical beam 1001A2 is connected to the first end of the first horizontal beam 1001A1 through the first arc connector 111, and the first vertical beam 1001A2 is detachably connected to the first arc connector 111. Another first vertical beam 1001A2 is connected to the second end of the first horizontal beam 1001A1 through the second arc connector 112, and the anther first vertical beam 1001A2 is detachably connected to the second arc connector 112.

In some other embodiments, as shown in FIGS. 4 and 5, one first vertical beam 1001A2, one second vertical beam 1001B2 and one third vertical beam 1001C3 that are at a same side of the first to fifth horizontal beams are integrally formed as a first sub-vertical beam 108B, and one fourth vertical beam 1001D2 at the same side is regarded as a second sub-vertical beam 108A. The first sub-vertical beam 108B is detachably connected to the second sub-vertical beam 108A. Another first vertical beam 1001A2, another second vertical beam 1001B2 and another third vertical beam 1001C3 that are at another same side of the first to fifth horizontal beams are integrally formed as a third sub-vertical beam 109B, and another fourth vertical beam 1001D2 at the another same side of the first to fifth horizontal beams is regarded as a fourth sub-vertical beam 109A. The third sub-vertical beam 109B is detachably connected to the fourth sub-vertical beam 109A.

For example, as shown in FIG. 5, a connecting position of the first sub-vertical beam 108B and the second sub-vertical beam 108A and a connecting position of the third sub-vertical beam 109B and the fourth sub-vertical beam 109A are both located between the fourth horizontal beam 1001C2 and the fifth horizontal beam 1001D1. In a case where a larger-sized image acquisition device 130 is needed, if the space between the fourth horizontal beam 1001C2 and the fifth horizontal beam 1001D1 is not enough to accommodate the larger-sized image acquisition device 130, the second sub-vertical beam 108A and the fourth sub-vertical beam 109A may be detached from the frame 100, and then a new second sub-vertical beam 108A with a longer length and a new fourth sub-vertical beam 109A with a longer length are assembled on the first sub-vertical beam 108B and the third sub-vertical beam 1096, respectively, so that the new image acquisition device 130 may be accommodated between the fourth horizontal beam 1001C2 and the fifth horizontal beam 1001D1.

In some examples, as shown in FIG. 5, the frame body 1001 further includes a first arc connector 111 and a second arc connector 112. The first sub-vertical beam 108B is connected to the first end of the first horizontal beam 1001A1 through the first arc connector 111, and the first sub-vertical beam 108B is detachably connected to the first arc connector 111. The third sub-vertical beam 109B is connected to the second end of the first horizontal beam 1001A1 through the second arc connector 112, and the third sub-vertical beam 109B is detachably connected to the second arc connector 112.

Of course, since the first sub-vertical beam 108B is detachably connected to the first arc connector 111, and the third sub-vertical beam 109B is detachably connected to the second arc connector 112, the space between the first horizontal beam 1001A1 and the second horizontal beam 1001B1 may also be increased by replacing a longer first sub-vertical beam 108B and a longer third sub-vertical beam 109B.

Figure 6:
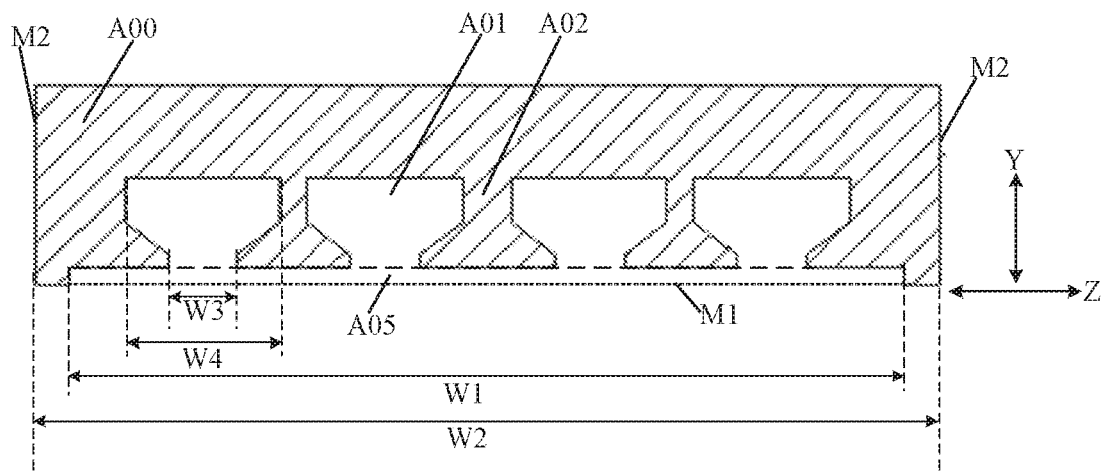
FIG. 6 is a cross-sectional diagram of a first-type horizontal beam taken along line C-C' in FIG. 5.
Figure 7A:
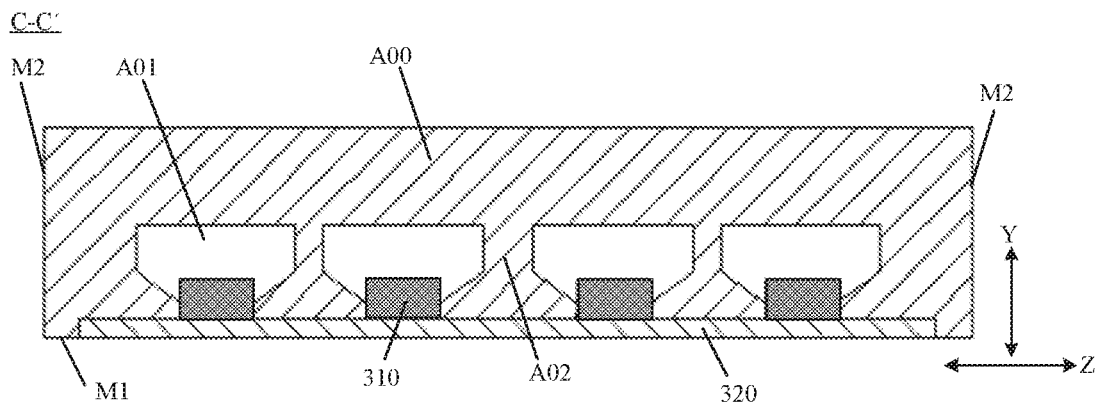
FIG. 7A is a cross-sectional diagram of another first-type horizontal beam taken along line C-C' in FIG. 5.
Figure 7B:
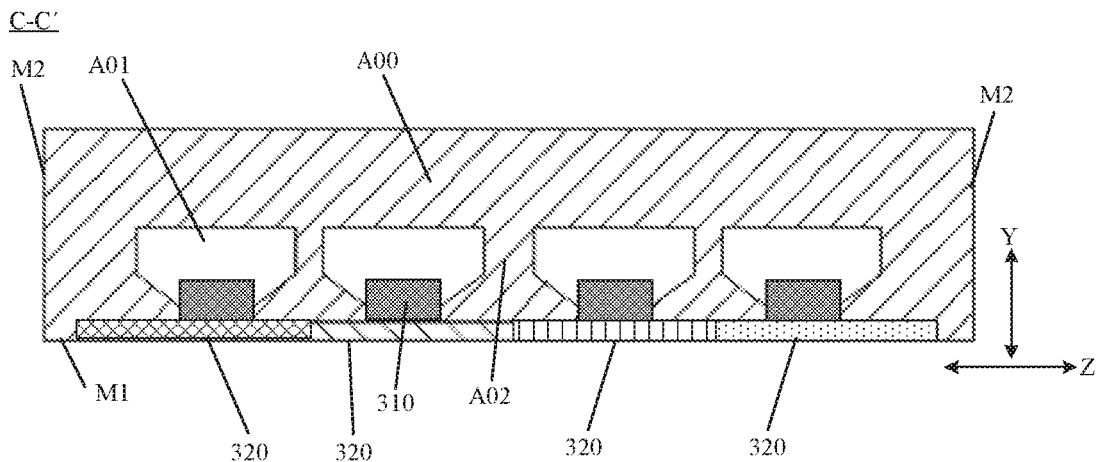
FIG. 7B is a cross-sectional diagram of yet another first-type horizontal beam taken along line C-C' in FIG. 5.
Figure 8:
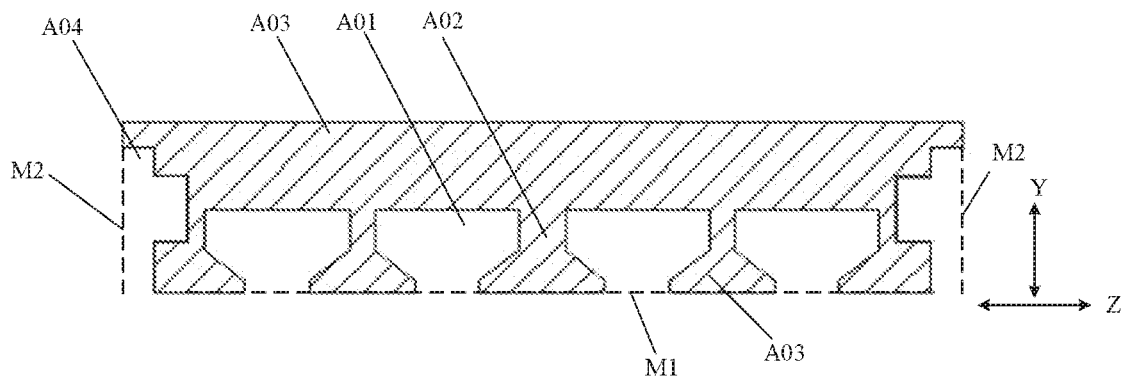
FIG. 8 is a cross-sectional diagram of a second-type horizontal beam taken along line C-C' in FIG. 5.
Figure 9:
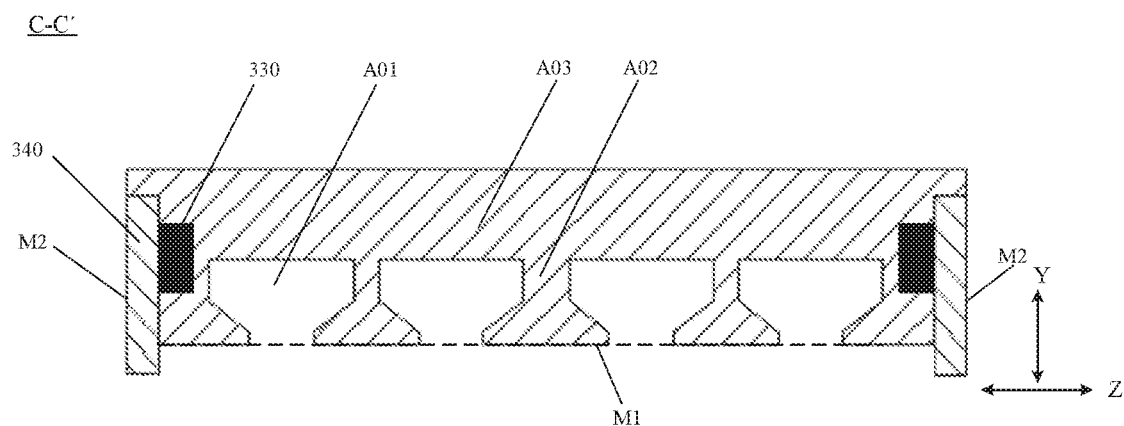
FIG. 9 is a cross-sectional diagram of another second-type horizontal beam taken along line C-C' in FIG. 5.

The structures of the first to fifth horizontal beams are described below through examples with reference to FIGS. 5 to 9. FIG. 6 is a cross-sectional diagram of a first-type horizontal beam taken along line C-C' in FIG. 5; FIG. 7A is a cross-sectional diagram of another first-type horizontal beam taken along line C-C in FIG. 5; FIG. 7B is a cross-sectional diagram of yet another first-type horizontal beam taken along line C-C' in FIG. 5; FIG. 8 is a cross-sectional diagram of a second-type horizontal beam taken along line C-C' in FIG. 5; and FIG. 9 is a cross-sectional diagram of another second-type horizontal beam taken along line C-C' in FIG. 5. The sections are parallel to a plane defined by the third direction Z and the first direction Y.

In some embodiments, as shown in FIGS. 5 to 7B, at least one of the first to fifth horizontal beams is a first-type horizontal beam, and the first-type horizontal beam includes a first horizontal beam body A00 and at least one first functional groove A01 disposed in a surface of the first horizontal beam body A00 facing away from or facing the base assembly 1000, and an extension direction of the at least one first functional groove A01 is the same as an extension direction of the first horizontal beam body A00, i.e., the second direction X.

In some examples, the surface of the first horizontal beam body A00 provided with the at least one first functional groove A01 is defined as a functional surface M1 of the first horizontal beam body A00, and the functional surface M1 of the first horizontal beam body A00 is perpendicular to the first direction Y. In addition, the first horizontal beam body A100 has two opposite visible surfaces M2 parallel to the display surface of the first display screen 110 and the second display screen 120, that is, the visible surfaces M2 of the first horizontal beam body A00 is parallel to the plane defined by the first direction Y and the second direction X.

In some examples, as shown in FIG. 6, the at least one first functional groove A01 includes a plurality of first functional grooves that are arranged in the third direction Z, and the extension direction of each first functional groove A01 is the same as the extension direction of the first horizontal beam body A00. The first horizontal beam body A00 includes a first ridge A02 disposed between every two adjacent first functional grooves, and the first ridge A02 may serve as a reinforcing rib to ensure that the first horizontal beam body A00 has a certain structural strength.

By forming the at least one first functional groove A01 in the first horizontal beam body A00, the use amount of the material of the first-type horizontal beam may be effectively reduced, thereby reducing the weight of the first-type horizontal beam and the cost.

In some embodiments, as shown in FIGS. 7A and 7B, the frame body 1001 further includes at least one first magnetic part 310 and at least one first horizontal beam trim panel 320. The first magnetic part 310 is disposed in a corresponding first functional groove A01. The first horizontal beam trim panel 320 is disposed on the first horizontal beam body A00 and covers the at least one first magnetic part 310. For example, the first horizontal beam trim panel 320 includes metal, and the first horizontal beam trim panel 320 is absorbed onto the first horizontal beam body A00 by the at least one first magnetic part 310.

In some examples, each first functional groove A01 is provided with one first magnetic part 310 therein. For example, as shown in FIG. 7A, the horizontal beam body A00 includes four first functional grooves A01 arranged in the third direction Z, and each first functional groove A01 is provided with a corresponding first magnetic part 310 extending in the second direction X.

In some examples, as shown in FIG. 7A, the at least one first horizontal beam trim panel 320 includes one first horizontal beam trim panel 320, and the first horizontal beam trim panel 320 covers the at least one first magnetic part 310. In some other examples, the at least one first horizontal beam trim panel 320 includes a plurality of first horizontal beam trim panels 320, and the at least one first magnetic part 310 includes a plurality of first magnetic parts 310. Each first horizontal beam trim panel 320 covers one or more first magnetic parts 310. For example, as shown in FIG. 7B, the at least one first horizontal beam trim panel 320 includes four first horizontal beam trim panels 320, and the at least one first magnetic part 310 includes four first magnetic parts 310. Each first horizontal beam trim panel 320 covers a corresponding first magnetic parts 310.

In some embodiments, as shown in FIG. 6, the first-type horizontal beam further includes a first limit groove A05 disposed in the surface of the first horizontal beam body A00 in which the at least one first functional groove A01 is disposed. The first limit groove A05 extends in the extension direction of the first horizontal beam body A00 (i.e., the second direction X), and is connected to the at least one first functional groove A01. The size of the first limit groove A05 is matching with the size of the first horizontal beam trim panel 320, so that the first horizontal beam trim panel 320 may be disposed in the first limit groove A05, thereby preventing the movement of first horizontal beam trim panel 320 relative to the first horizontal beam body A00.

For example, in the extension direction of the first horizontal beam body A00 (i.e., the second direction X), the dimension of the first limit groove A05 is equal to the dimension of the first horizontal beam body A00, and in the third direction Z, the dimension W1 of the first limit groove A05 is less than the dimension W2 of the first horizontal beam body A00.

In some examples, in a case where the position of the first-type horizontal beam (for example, the first horizontal beam 1001A1) is at a relatively low position, the surface of the first horizontal beam body A00 of the first-type horizontal beam facing away from the base assembly 1000 is the functional surface M1; or in a case where the position of the first-type horizontal beam (for example, the fifth horizontal beam 1001D1 or the fourth horizontal beam 1001C2) is at a relatively high position, the surface of the first horizontal beam body A00 of the first-type horizontal beam proximate to the base assembly 1000 is the functional surface M1. By arranging the first magnetic part 310 in the first functional groove A01 and absorbing the first horizontal beam trim panel 320 on the first-type horizontal beam through the first magnetic part 310, the first horizontal beam trim panel 320 may shield the first functional groove A01, thereby avoiding the dust entering the first functional groove A01.

In some embodiments, the first magnetic part 310 includes a magnetic body such as a magnet. The structure of the magnetic body is related to the structure of the first functional groove A01, as long as the magnetic body can be embedded in the first functional groove A01. In order to facilitate the magnetic body to be embedded in the first functional groove A01, as shown in FIG. 6, in the third direction Z, the width W3 of the opening (i.e., the portion closer to the functional surface M1) of the first functional groove A01 is less than the width W4 of its bottom (i.e., the portion away from the functional surface M1), so that the magnetic body may be embedded in the opening of the first functional groove A01. The structure of the first functional groove A01 is not limited thereto, as long as the magnetic body may be embedded in the first functional groove A01.

In some embodiments, as shown in FIG. 8, at least one of the first to fifth horizontal beams is a second-type horizontal beam, and the second-type horizontal beam includes a second horizontal beam body A03 and at least one step groove A04 disposed in at least one visible surface M2 of the second horizontal beam body A03 parallel to the display surfaces of the first display screen 110 and the second display screen 120. For example, as shown in FIG. 8, the at least one step groove A04 includes two step grooves A04, and each visible surface M2 is provided with a step groove A04. The extension direction of the at least one step groove A04 is the same as an extension direction of the second horizontal beam body A03, i.e., the second direction X.

In this way, the use amount of the material of the second-type horizontal beam may be effectively reduced, thereby reducing the weight of the second-type horizontal beam and the costs.

In some examples, as shown in FIG. 8, the second-type horizontal beam further includes at least one first functional groove A01. With regard to the first functional groove A01, reference may be made to the description of the first functional groove A01 described above, and details will not be described herein again.

In addition, the structure of the second horizontal beam body A03 may be referred to the structure of the first horizontal beam body A00 described above, and the similarities are not described herein again.

Figure 10:
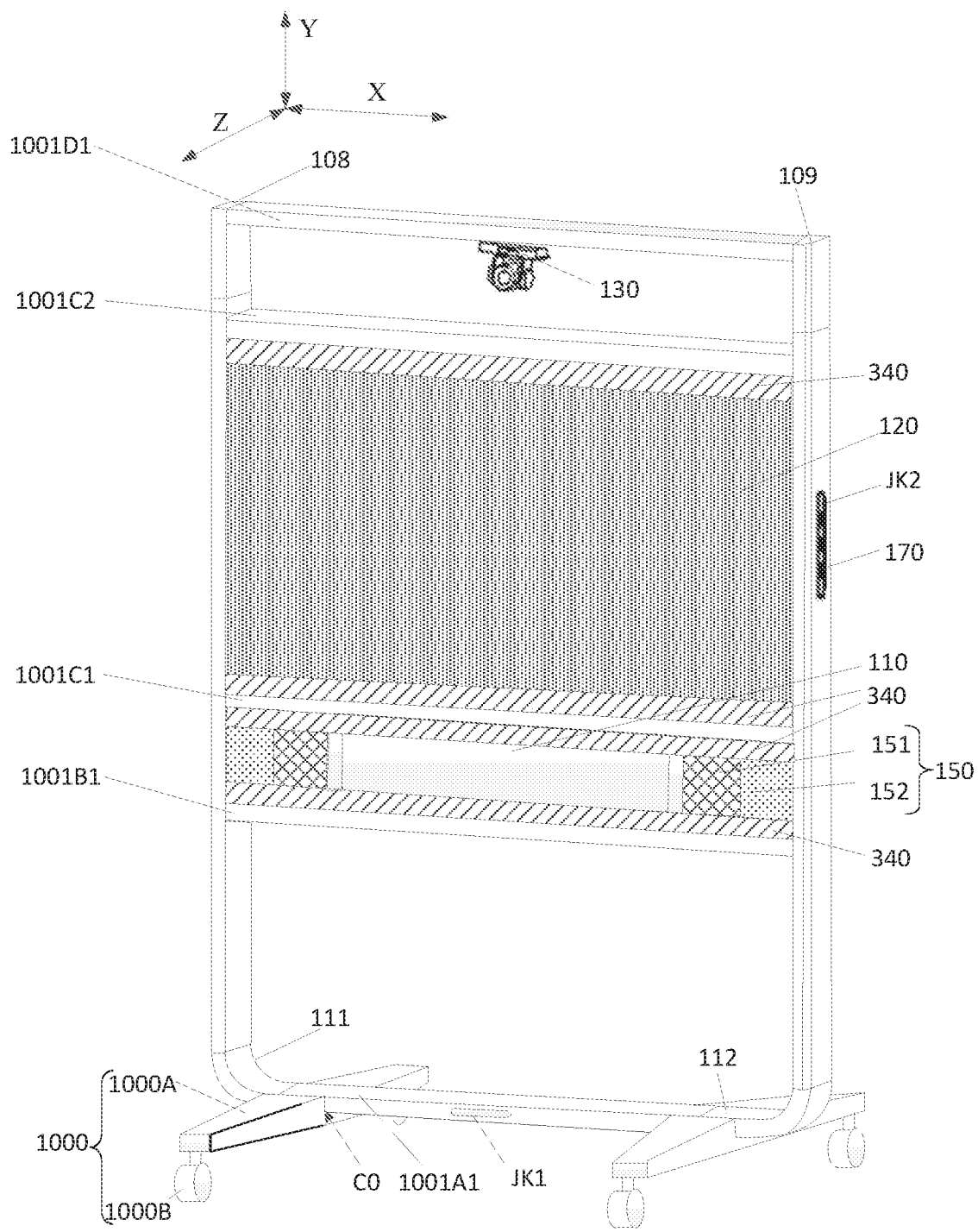
FIG. 10 is a structural diagram of yet another display apparatus, in accordance with some embodiments.

As shown in FIG. 9, the frame body 1001 further includes at least one second magnetic part 330 and at least one second horizontal beam trim panel 340. For example, as shown in FIG. 9, the at least one second magnetic part 330 includes two second magnetic parts 330, and the at least one second horizontal beam trim panel 340 includes two second horizontal beam trim panels 340. Each second magnetic part 330 and a corresponding second horizontal beam trim panel 340 are disposed on a corresponding visible surfaces M2 of the second horizontal beam body A03. For another example, as shown in FIG. 10, the at least one second magnetic part 330 includes four second magnetic parts 330, and the at least one second horizontal beam trim panel 340 includes four second horizontal beam trim panels 340. Two second magnetic part 330 and two corresponding second horizontal beam trim panel 340 are disposed on a corresponding visible surfaces M2 of the second horizontal beam body A03.

As shown in FIGS. 8 and 9, the step groove A04 includes at least one first groove and a second groove that are connected with the at least one first groove. The second magnetic part 330 is disposed in a first groove of a step groove A04. The second horizontal beam trim panel 340 is disposed in a second groove of a step groove A04. For example, the second horizontal beam trim panel 340 is absorbed onto the second horizontal beam body A03 by at least one second magnetic part 330. The second horizontal beam trim panel 340 extends out of the step groove A04 in the first direction Y.

The structure of the second magnetic part 330 may be referred to the structure of the first magnetic part 310 described above, and the structure of the second horizontal beam trim panel 340 may be referred to the structure of the first horizontal beam trim panel 320 described above, which will not be described in detail herein.

The visible surface M2 of the second horizontal beam body A03 may be referred to the description of the visible surface M2 of the second horizontal beam body A00. The visible surface M2 of the second horizontal beam body A03 may be the surface of the second horizontal beam body A03 parallel to the display surfaces of the first display screen 110 and the second display screen 120. In some examples, the visible surface M2 of the second horizontal beam body A03 may be defined according to the application scene of the display apparatus 201.

Considering that the second display screen 120 is disposed between the third horizontal beam 1001C1 and the fourth horizontal beam 1001C2, a gap may exist between the second display screen 120 and the third horizontal beam 1001C1, and another gap may exist between the second display screen 120 and the fourth horizontal beam 1001C2. Similarly, the first display screen 110 and the at least one audio device 150 are disposed between the second horizontal beam 1001B1 and the third horizontal beam 1001C1, a gap may exist between the first display screen 110 (and/or the at least one audio device 150) and the second horizontal beam 1001B1, and another gap may exist between the first display screen 110 (and/or the at least one audio device 150) and the third horizontal beam 1001C1.

In some embodiments, as shown in FIG. 10, each of the second horizontal beam 1001B1, the third horizontal beam 1001C1 and the fourth horizontal beam 1001C2 is the second-type horizontal beam.

In some examples, as shown in FIG. 10, the second horizontal beam trim panel 340 absorbed on the fourth horizontal beam 1001C2 extends beyond the fourth horizontal beam 1001C2 in a direction pointing to the first horizontal beam 1001A1 from the fifth horizontal beam 1001D1, and this second horizontal beam trim panel 340 seals the gap between the second display screen 120 and the fourth horizontal beam 1001C2.

In this way, the second display screen 120 may be limited by the second horizontal beam trim panel 340 absorbed on the fourth horizontal beam 1001C2, which may prevent the movement of the second display screen 120 relative to the second frame portion 1001C in the first direction Y, and may prevent dust from entering the display apparatus 201.

In some examples, as shown in FIG. 10, the second horizontal beam trim panel 340 absorbed on the third horizontal beam 1001C1 extends beyond the third horizontal beam 1001C1 in a direction pointing to the fifth horizontal beam 1001C1 from the first horizontal beam 1001A1, and this second horizontal beam trim panel 340 seals the gap between the second display screen 120 and the third horizontal beam 1001C1.

In this way, the second display screen 120 may be limited by the second horizontal beam trim panel 340 on the third horizontal beam 1001C1, which may prevent the movement of the second display screen 120 relative to the second frame portion 1001C in the first direction Y, and may prevent dust from entering the display apparatus 201.

In some examples, as shown in FIG. 10, the second horizontal beam trim panel 340 absorbed on the third horizontal beam 1001C1 extends beyond the third horizontal beam 1001C1 in a direction pointing to the first horizontal beam 1001A1 from the fifth horizontal beam 1001C1, and this second horizontal beam trim panel 340 seals the gap between the third horizontal beam 1001C1 and both the first display screen 110 and the at least one audio device 150.

In this way, the first display screen 110 may be limited by the second horizontal beam trim panel 340 on the third horizontal beam 1001C1, which may prevent the movement of the first display screen 110 relative to the first frame portion 1001B in the first direction X, and may prevent dust from entering the display apparatus 201.

In some examples, as shown in FIG. 10, the second horizontal beam trim panel 340 absorbed on the second horizontal beam 1001B1 extends beyond the second horizontal beam 1001B1 in a direction pointing to the fifth horizontal beam 1001C1 from the first horizontal beam 1001A1, and this second horizontal beam trim panel 340 seals the gap between the second horizontal beam 1001B1 and both the first display screen 110 and the at least one audio device 150.

In this way, the first display screen 110 may be limited by the second horizontal beam trim panel 340 on the second horizontal beam 1001B1, which may prevent the movement of the first display screen 110 relative to the first frame portion 1001B in the first direction Y, and may prevent dust from entering the display apparatus 201.

The structures of the first to fifth vertical beams 1001A2 to 1001C2, the first and second integrated vertical beams 108 and 109, the first to fourth sub-vertical beams 108A to 109B are described below through examples with reference to FIGS. 5, 11 and 12. FIG. 12 is a cross-sectional diagram of a first-type vertical beam taken along line D-D' in FIG. 5; and FIG. 12 is a cross-sectional diagram of another first-type vertical beam taken along line D-D' in FIG. 5. The sections are parallel to a plane defined by the third direction Z and the second direction X.

Figure 11:
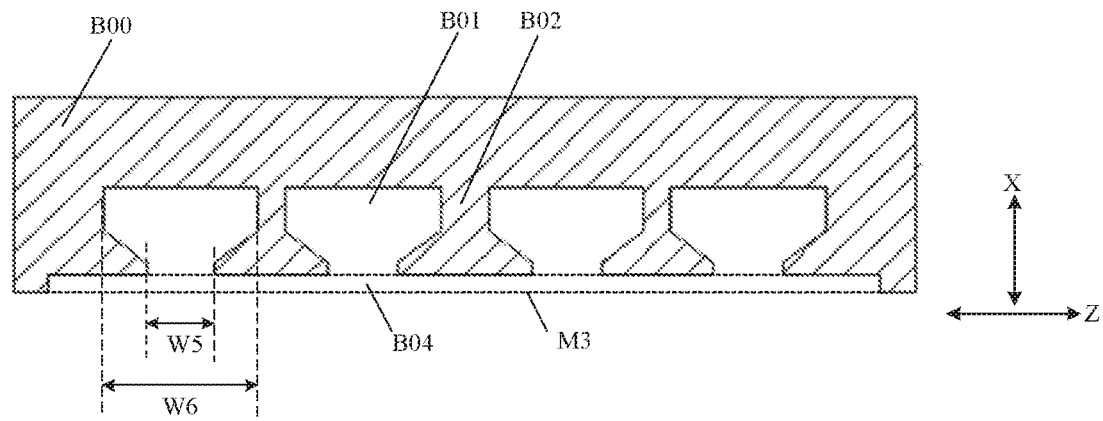
FIG. 11 is a cross-sectional diagram of a first-type vertical beam taken along line D-D' in FIG. 5.
Figure 12:
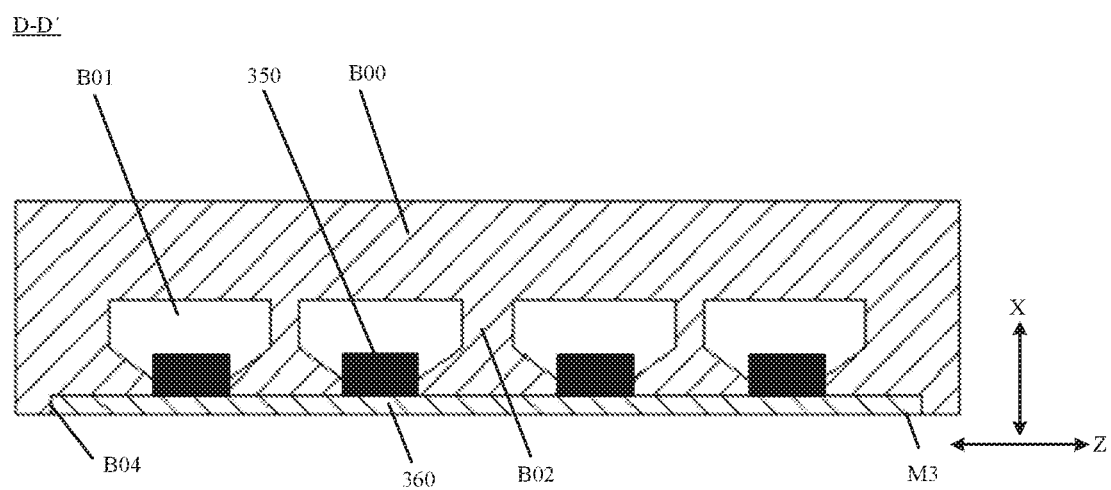
FIG. 12 is a cross-sectional diagram of another first-type vertical beam taken along line D-D' in FIG. 5.

In some embodiments, as shown in FIG. 11, at least one of all first to fourth vertical beams, the first and second integrated vertical beams, and the first to fourth sub-vertical beams is a first-type vertical beam, and the first-type vertical beam includes a vertical beam body B00 and at least one second functional groove B01 disposed in the vertical beam body B00, and the at least one second functional groove B01 extends along the first direction Y.

In some examples, as shown in FIG. 11, the at least one second functional groove B01 includes a plurality of second functional grooves B01 arranged in the third direction Z. The vertical beam body B00 includes a second ridge B02 disposed between every two adjacent second functional grooves B01, and the second ridge B02 may serve as a reinforcing rib to ensure that the vertical beam body B00 has a certain structural strength.

By forming at least one second functional groove B01 in the vertical beam body B00, the use amount of the material of the first-type vertical beam and the weight of the first-type vertical beam may be effectively reduced. In addition, since the structure of the first-type vertical beam is the same as the structure of the first-type horizontal beam, a same mold may be used to form the horizontal beam and the vertical beam, thereby reducing the costs. It will be noted that the horizontal beam and the vertical beam may be micromachined to meet different needs after the horizontal beam and the vertical beam are formed with the same mold.

As shown in FIG. 12, the frame body 1001 further includes at least one third magnetic part 350 and at least one vertical beam trim panel 360. The third magnetic part 350 is disposed in a corresponding second functional groove B01. The vertical beam trim panel 360 is disposed on the vertical beam body B00 and covers the at least one third magnetic part 350. For example, the vertical beam trim panel 360 is absorbed on the vertical beam body B00 by the at least one third magnetic part 350.

In some examples, each second functional groove B01 is provided with a third magnetic part 350. For example, as shown in FIG. 12, the vertical beam body BOO includes four second functional grooves B01 arranged in the third direction Z, and each second functional groove B01 extends along the first direction Y. Each second functional groove B01 is provided with a third magnetic part 350 extending in the first direction Y.

For each first-type vertical beam, one vertical beam trim panel 360 or a plurality of vertical beam trim panels 360 may be provided, which may be determined according to actual situations.

In some embodiments, as shown in FIG. 11, the first-type vertical beam further includes a second limit groove B04 in the surface of the vertical beam body BOO in which the at least one second functional groove B01 is disposed. The second limit groove B04 extends in in the extension direction of the vertical beam body B00 (i.e., the first direction Y), and is connected to the at least one second functional groove B01. The size of the second limit groove B04 is matching with the size of the vertical beam trim panel 360, so that the vertical beam trim panel 360 may be disposed in the second limit groove B04, thereby preventing the movement of the vertical beam trim panel 360 relative to the vertical beam body B00.

In some examples, the surface of the vertical beam body B00 provided with the at least one second functional groove B01 is defined as the functional surface M3 of the vertical beam body B00, and the functional surface M3 of the vertical beam body B00 is perpendicular to the first direction Y.

In some embodiments, the third magnetic part 350 includes a magnetic body such as a magnet. The structure of the magnetic body is related to the structure of the second functional groove B01, as long as the magnetic body can be embedded in the second functional groove B01. In order to facilitate the magnetic body to be embedded in the second functional groove B01, as shown in FIG. 11, in the third direction Z, the width W5 of the opening (i.e., the portion closer to the functional surface M3) of the second functional groove B01 is less than the width W6 of its bottom (i.e., the portion away from the functional surface M3), so that the magnetic body may be embedded in the opening of the second functional groove B01. The structure of the second functional groove B01 is not limited thereto, as long as the magnetic body may be embedded in the second functional groove B01.

With regard to the vertical beam, reference may be made to the description of the first horizontal beam described above, and details will not be described herein again.

In some embodiments, as shown in FIGS. 5 and 10, the display apparatus 201 further includes at least one first interface JK1, at least one second interface JK2 and at least one button 170. The at least one first interface JK1 is disposed on at least one of the first to fifth horizontal beams, the second interface assembly JK2 and the at least one button 170 are disposed on at least one of all the first to fourth vertical beams. The at least one first interface JK1, the at least one second interface JK2 and the at least one button 170 are connected to a processor of the display apparatus 201.

The at least one second interface JK2 and the at least one button 170 may be disposed on a same vertical beam, and the at least one second interface JK2. For example, the at least one button 170 may be located in a third vertical beam 1001C3.

For example, the at least one button 170 includes at least one of a power switch, a sound adjustment button, an image brightness adjustment button, and the like.

For example, the at least one second interface JK2 includes at least one of a universal serial bus (USB) interface, a voice input interface, a data input interface, and the like.

For example, the at least one first interface JK1 is disposed on the first horizontal beam 1001A1. The at least one first interface JK1 may include the interface with a lower frequency of use. For example, the at least one first interface JK1 includes at least one of a power interface, a network cable interface, and the like.

Figure 13:
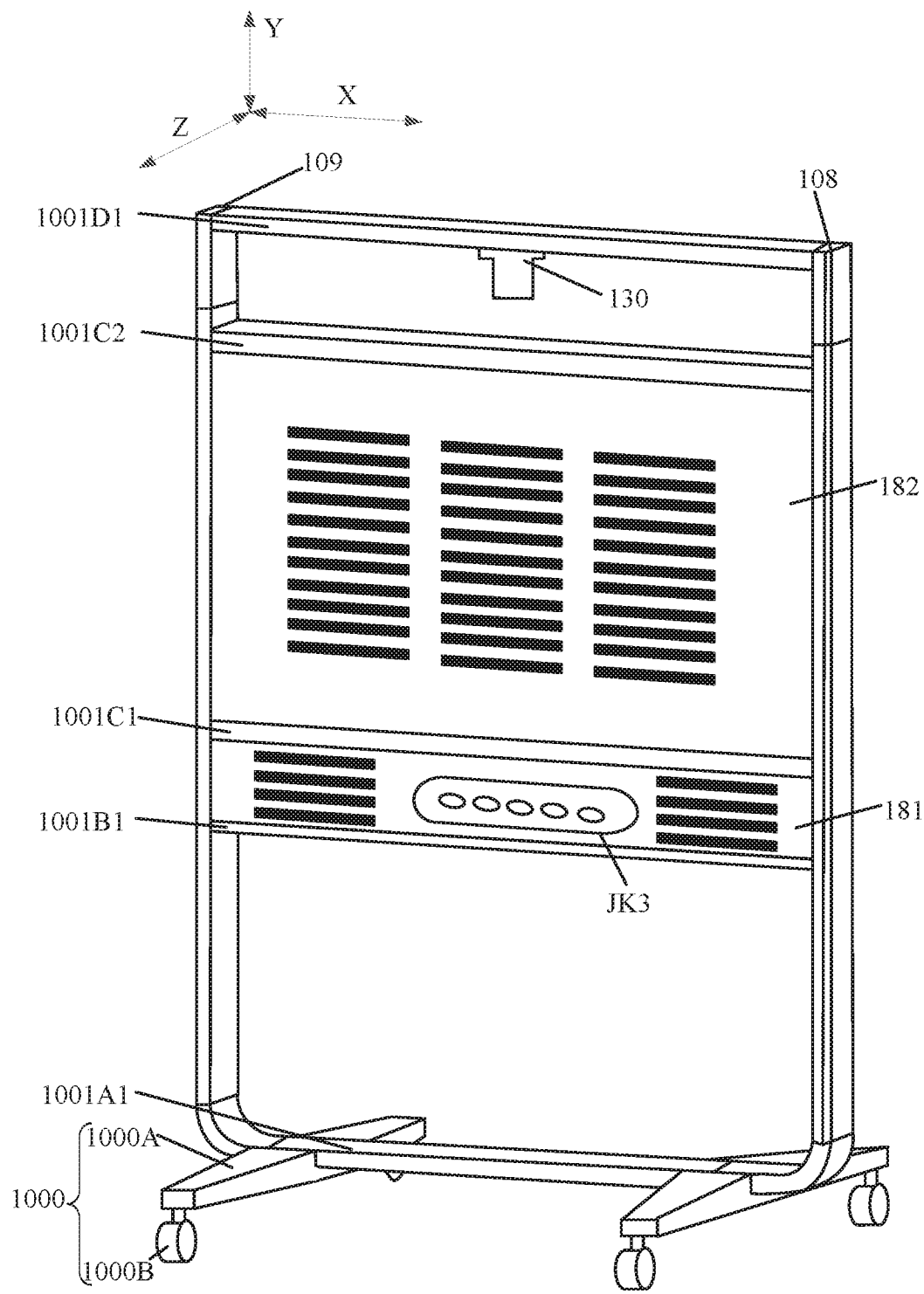
FIG. 13 is a schematic diagram showing a back structure of a display apparatus, in accordance with some embodiments.

In some embodiments, as shown in FIG. 13, the display apparatus 201 further includes a second cover plate 181, a third cover plate 182 and at least one third interface JK3. The second cover plate 181 is disposed on the back surface of the first display screen 110. The third cover plate 182 is disposed on the back surface of the second display screen 120. The at least one third interface JK3 is disposed on the second cover plate 181. The second cover plate 181 and the third cover plate 182 are fixed to the frame body 1001. In order to facilitate heat dissipation, the second cover plate 181 and/or the third cover plate 182 are provided with heat dissipation holes.

The at least one third interface JK3 may include an interface with higher frequency of use. For example, the at least one third interface JK3 includes at least one of a digital signal interface, an analog signal interface, an audio signal interface, and the like. The digital signal interface may be a high definition multimedia interface (HDMI). It will be noted that one or more digital signal interfaces may be provided, and which can be set according to actual situations.

In addition, interfaces included in the at least one first interface JK1, the at least one second interface JK2 and the at least one third interface JK3 may be parallel interfaces or serial interfaces, and the type of the second interface JK2 and the third interface JK3 may be selected according to actual situations.

Figure 14:
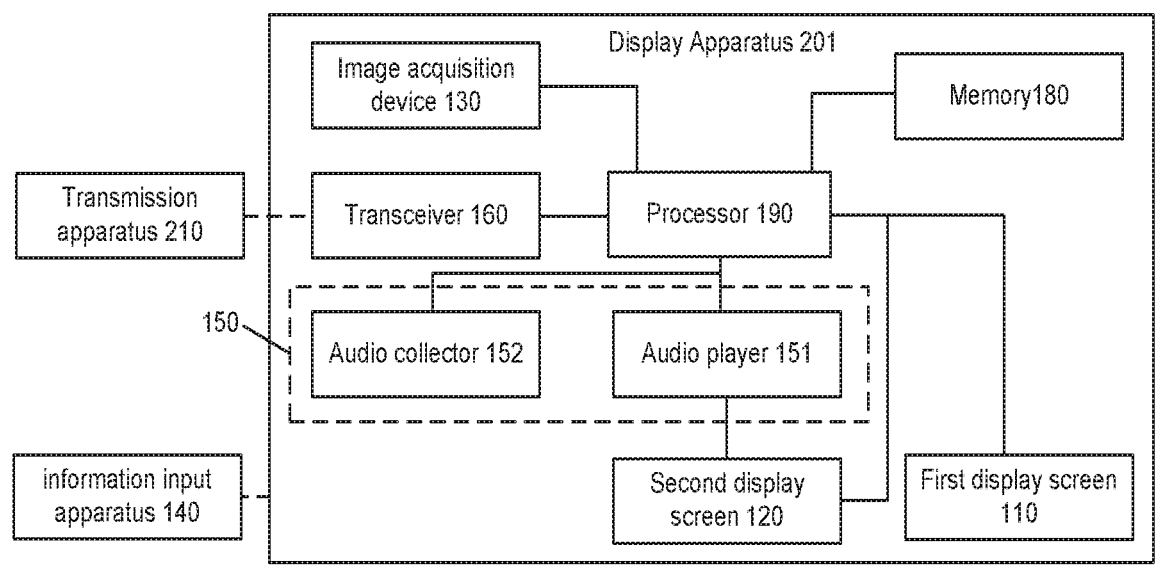
FIG. 14 is a schematic diagram showing electrical connections of devices in a display apparatus, in accordance with some embodiments.

In order to enable the display apparatus 201 to communicate with at least one other display apparatus 201, as shown in FIG. 14, the display apparatus 201 further includes a transceiver 160. The transceiver 160 may be disposed within the frame 100, or may be disposed on the surface of the frame 100.

Referring to FIG. 14, the display apparatus 201 further includes a memory 180 and a processor 190. The memory 180 and the processor 190 may be disposed within the frame 100. The processor 190 is connected to the transceiver 160, the memory 180, the image acquisition device 130, the at least one audio device 150, the first display screen 110 and the second display screen 120. The transceiver 160 is configured to receive remote information sent by an external apparatus (i.e., any other display apparatus 201) through a transmission apparatus 210. The remote information may include remote image information, remote text information and remote audio information. The processor 190 is configured to control the second display screen 120 to display the remote image information and the remote text information. In the case where the audio device 150 includes an audio player 151, the processor 190 is further configured to control the audio player 151 in the audio device 150 to play the remote audio information.

In addition, the processor 190 is further configured to store local image information acquired by the image acquisition device 130. In the case where the audio device 150 includes an audio collector 152, the processor 190 is further configured to store local audio information collected by the audio collector 152 in the audio device 150 as local information in the memory 180. The processor 190 is further configured to send the local information to the transceiver 160, and then the transceiver 160 transmits the local information to an external apparatus (i.e., another display apparatus 201). Of course, the processor 190 may further be configured to send the local image information to the first display screen 110 for display.

For example, the transceiver 160 may be a WIFI module, a Bluetooth module, a Zigbee module, etc. The Bluetooth module may be CC2541 CC2640, SKB369, RF-BM-SOA, etc. The WIFI module may be CC3100, CC2530, MW300, BCM4390, MT7688, etc. The Zigbee module may be JN5169, TI's CC2530, etc.

In order to make the information displayed on the second display screen 120 diversified, in some embodiments, the display apparatus 201 may be connected to the information input apparatus 140 through an interface described above. For example, if relevant information is needed to be displayed for the local participants, the display apparatus 201 may receive the relevant information entered by the user through the information input apparatus 140, and then the relevant information is displayed on the second display screen 120. The image information and the relevant information included in the local information may be displayed simultaneously, or only one of them is displayed once a time.

For example, the information input apparatus 140 may be a terminal apparatus such as a mobile phone, a tablet computer, a touch panel, or a desktop computer, and may also be other input apparatus such as a physical keyboard, a trackball, a mouse, a joystick, or a voice input apparatus.

In order to illustrate an installation process of the display apparatus 201, a detailed description will be given below with reference to FIG. 15 which shows the exploded view of the display apparatus 201.

In a first step, the first integrated vertical beam 108, one end of the first arc connector 111, the first end of the second horizontal beam 1001B1, the first end of the third horizontal beam 1001C1, and the first end of the fourth horizontal beam 1001C2, and the first end of the fifth horizontal beam 1001D1 are installed together. The second integrated vertical beam 109, one end of the second arc connector 112, the second end of the second horizontal beam 1001B1, the second end of the third horizontal beam 1001C1, the second end of the fourth horizontal beam 1001C2, the second end of the fifth horizontal beam 1001C1 are installed together. Another end of the first arc connector 111 is connected to the first end of the first horizontal beam 1001A1, and another end of the second arc connector 112 is connected to the second end of the first horizontal beam 1001A1. The first horizontal beam 1001A1 is connected to the base assembly 1000. As a result, the frame 100 is formed. Herein, according to the position of horizontal beam that needs to be shielded, the first magnetic part 310 may be embedded in the first functional groove A01 disposed on the horizontal beam body of the horizontal beam, and the second magnetic part 330 is embedded in the step groove A04 disposed on the visible surface M2 of the horizontal beam body of the horizontal beam.

In a second step, the second display screen 120 is mounted within the frame 100 from the back of the frame 100, and is located between the third horizontal beam 1001C1 and the fourth horizontal beam 1001C2, and the first display screen 110 is also mounted within the moveable frame 100 from the back of the frame 100, and is located between the second horizontal beam 1001B1 and the third horizontal beam 1001C1.

In a third step, the image acquisition device 130 is suspended on the fifth horizontal beam 1001C1, and two audio devices 150 are fixed between the fifth horizontal beam 105 and the sixth horizontal beam 106, and are provided on two sides of the first display screen 110. The at least one first interface JK1 is mounted on the first horizontal beam 1001A1. The at least one button 170 and the at least one second interface JK2 are mounted on a side face of the second integrated vertical beam 109. Of course, the at least one first interface JK1 and the at least one second interface JK2 may also be mounted in other suitable positions, which are not limited herein. In addition, the at least one first interface JK1 may be mounted on the base assembly 1000 before the first horizontal beam 1001A1 is mounted to the base assembly 1000. Before the second integrated vertical beam 109 is mounted, the at least one button 170 and the at least one second interface JK2 are mounted on the second integrated vertical beam 109.

In a fourth step, the second display screen 120 is locked between the third horizontal beam 1001C1 and the fourth horizontal beam 1001C2 by the third cover plate 182 at the back side of the second display screen 120. The first display screen 110 is locked between the second horizontal beam 1001B1 and the third horizontal beam 1001C1 by the second cover plate 181 at the back side of the first display screen 110. The at least one third interface JK3 is mounted on the second cover plate 181.

In a fifth step, at least one first functional groove A01 disposed in the first horizontal beam 1001A1, and second functional grooves B01 that are disposed in both the first integrated vertical beam 108 and the second integrated vertical beam 109 and located between the first horizontal beam 1001A1 and the second horizontal beam 1001B1 are decorated. In this case, the first functional groove A01 is disposed in a surface of the first horizontal beam 1001A1 facing the first display screen 110, and the first horizontal beam trim panel 320 (which is defined as a horizontal beam functional surface trim panel HL10) is absorbed on the surface of the first horizontal beam 1001A1 facing the first display screen 110. At least one second functional groove is disposed in a surface of the first integrated vertical beam 108 facing the second integrated vertical beam 109, and a vertical beam trim panel 360 (which is defined as a first vertical beam trim panel SL1) is absorbed on this surface of the first integrated vertical beam 108. At least one second functional groove is disposed in a surface of the second integrated vertical beam 109 facing the first integrated vertical beam 108, and another vertical beam trim panel 360 (which is defined as a second vertical beam trim panel SL2) is absorbed on this surface of the second integrated vertical beam 109.

In addition, the first arc connector 111 and the second arc connector 112 may be also provided with at least one functional grooves similar to the above functional groove, and an arc trim panel L30 may be provided for the functional grooves of the first arc connector 111 and the second arc connector 112, so as to decorate the functional grooves. Considering the continuity of connection of the first horizontal beam 1001A, the first arc connector 111, the second arc connector 112, the first integrated vertical beam 108 and the second integrated vertical beam 109, the first vertical beam trim panel SL1, the second vertical beam trim panel SL2, the horizontal beam functional surface trim panel HL10, and the arc trim panel L30 may be integrally formed, and then absorbed on the frame body 1001 by magnetic parts.

In addition, the second functional grooves B01 disposed in the first integrated vertical beam 108 and the second integrated vertical beam 109 and located between the fourth horizontal beam 1001C2 and the fifth horizontal beam 1001C1 may also be decorated. At least one second functional groove B01 is disposed in a surface of the first integrated vertical beam 108 facing the second integrated vertical beam 109, and a vertical beam trim panel 360 which is defined as a third vertical beam trim panel SL3 is absorbed on this surface of the first integrated vertical beam 108. At least one second functional groove B01 is disposed in a surface of the second integrated vertical beam 109 facing the first integrated vertical beam 108, and a vertical beam trim panel 360 which is defined as a fourth vertical beam trim panel SL4 is absorbed on this surface of the second integrated vertical beam 109.

The second horizontal beam trim panel 340 corresponding to the fourth horizontal beam 1001C2 is defined as a first horizontal beam visible surface trim panel HL21, and may be absorbed on the visible surface of the fourth horizontal beam 1001C by at least one second magnetic part 330. The first horizontal beam visible surface trim panel HL21 extends beyond the fourth horizontal beam 1001C2 in a direction pointing to the first horizontal beam 1001A1 from the fourth horizontal beam 1001C2, so that the gap between the fourth horizontal beam 1001C2 and the second display screen 120 is shielded by the first horizontal beam visible surface trim panel HL21. Similarly, the second horizontal beam trim panel 340 corresponding to the third horizontal beam 1001C1 is defined as a second horizontal beam visible surface trim panel HL22, and is absorbed on the visible surface of the third horizontal beam 1001C1 by at least one second magnetic part 330. The second horizontal beam visible surface trim panel HL22 extends beyond the third horizontal beam 1001C1 in a direction pointing to the fourth horizontal beam 1001C2 from the first horizontal beam 1001A1, so that the gap between the third horizontal beam 1001C1 and the second display screen 120 is shielded by the second horizontal beam visible surface trim panel HL22.

It will be understood that the first horizontal beam trim panel 320, the second horizontal beam trim panel 340, the vertical beam trim panel 360 and the arc trim panel L30 are all metal trim panels, so that they can be absorbed on the magnetic parts. In addition, after the at least one first interface JK1, the at least one second interface JK2, the at least one third interface JK3 and the at least one button 170 are mounted, the above devices may be connected to the first display screen 110, the second display screen 120, the at least one audio device 150, the processor 190, etc. according to the connection relationship described above.

The forgoing descriptions are merely some implementation manners of the present disclosure, but the protection scope of the present disclosure is not limited thereto. Any person skilled in the art could readily conceive of changes or replacements within the technical scope of the present disclosure, which shall all be included in the protection scope of the present disclosure, Therefore, the protection scope of the present disclosure shall be subject to the protection scope of the claims.

What is claimed is:

1. A display apparatus, comprising:
a frame, the frame including at least one base assembly and a frame body fixed on the at least one base assembly;
a first display screen fixed within the frame body; and
a second display screen fixed within the frame body, wherein
the first display screen and the second display screen are arranged along a first direction; wherein
the frame body includes:
a connecting portion detachably fixed to the at least one base assembly; wherein the connecting portion includes two first vertical beams and a first horizontal beam connected to the two first vertical beams;
a first frame portion disposed on a side of the connecting portion away from the base assembly and connected to the connecting portion, wherein the first display screen is disposed within the first frame portion; the first frame portion includes two second vertical beams and a second horizontal beam connected to the two second vertical beams;
a second frame portion disposed on a side of the first frame portion away from the connecting portion and connected to the first frame portion, wherein the second display screen is disposed within the second frame portion; the second frame portion includes two third vertical beams, and a third horizontal beam and a fourth horizontal beam that are each connected to the two third vertical beams; and
a third frame portion disposed on a side of the second frame portion away from the first frame portion and connected to the second frame portion; wherein the third frame portion includes two fourth vertical beams and a fifth horizontal beam connected to the two fourth vertical beams;
the first direction is a direction from the connecting portion to the third frame portion;
the first to fifth horizontal beams are sequentially arranged along the first direction, and all first to fourth vertical beams extend in the first direction;
at least one of the first to fifth horizontal beams is a first-type horizontal beam; the first-type horizontal beam includes a first horizontal beam body and at least one first functional groove disposed in a surface of the first horizontal beam body, and the surface faces or faces away from the at least one base assembly, and an extension direction of the at least one first functional groove is the same as an extension direction of the first horizontal beam body; and
the frame body further includes:
at least one first magnetic part, each first magnetic part being disposed in a corresponding first functional groove; and
at least one first horizontal beam trim panel disposed on the first horizontal beam body and covering the at least one first magnetic part.

2. The display apparatus according to claim 1, wherein the display apparatus further comprises:
an image acquisition device disposed within the third frame portion; and
at least one audio device disposed within the first frame portion.

3. The display apparatus according to claim 1, wherein the third frame portion and the second frame portion are detachably connected.

4. The display apparatus according to claim 2, wherein the at least one audio device includes at least one audio player and at least one audio collector, and the display apparatus further comprises:
a transceiver configured to receive remote information sent by an external apparatus and transmit local information to the external apparatus, wherein the remote information includes at least one of remote image information, remote text information, and remote audio information;
a memory; and
a processor connected to the transceiver, the memory, the at least one audio device, the first display screen and the second display screen, wherein the processor is configured to perform at least one of:
controlling the second display screen to display the remote image information and the remote text information;
controlling the at least one audio player in the at least one audio device to play the remote audio information;
storing local image information acquired by the image acquisition device and local audio information acquired by the at least one audio collector in the at least one audio device as local information in the memory; and
transmitting the local information to the transceiver.

5. A display system, comprising at least two display apparatuses according to claim 4, wherein the at least two display apparatuses are configured to communicate with each other.

6. The display apparatus according to claim 1, wherein the at least one first functional groove includes a plurality of first functional grooves, and the plurality of first functional grooves are arranged along a direction perpendicular to the extension direction of the first horizontal beam body.

7. The display apparatus according to claim 1, wherein at least one of all first to fourth vertical beams is a first-type vertical beam, the first-type vertical beam includes a vertical beam body and at least one second functional groove disposed in the vertical beam body, the at least one second functional groove extends in the first direction, and the frame body further includes:
at least one third magnetic part, each third magnetic part being disposed in a corresponding second functional groove; and
at least one vertical beam trim panel disposed on the vertical beam body and covering the at least one third magnetic part.

8. The display apparatus according to claim 7, wherein the at least one second functional groove includes a plurality of second functional grooves, and the plurality of second functional grooves are arranged along a direction perpendicular to the first direction.

9. The display apparatus according to claim 7, wherein the first-type vertical beam further includes a second limit groove disposed in the vertical beam body and extending in the first direction; the second limit groove and the at least one second functional groove are connected, and the second limit groove is closer to an edge of the vertical beam body relative to the at least one second functional groove; and the vertical beam trim panel is disposed in the limit groove.

10. The display apparatus according to claim 7, wherein one of the two first vertical beams, one of the two second vertical beams, one of the two third vertical beams and one of the two fourth vertical beams disposed at a same side of the first to fifth horizontal beams are integrally formed as a first integrated vertical beam; and another of the two first vertical beams, another of the two second vertical beams, another of the two third vertical beams and another of the two fourth vertical beams disposed at another same side of the first to fifth horizontal beams are integrally formed as a second integrated vertical beam;

opposite ends of each of the first to fifth horizontal beams are fixed on the first integrated vertical beam and the second integrated vertical beam.

11. The display apparatus according to claim 1, wherein one of the two fourth vertical beams disposed at a same side of the first to fifth horizontal beams is a first sub-vertical beam; one of the two first vertical beams, one of the two second vertical beams and one of the two third vertical beams disposed at the same side of the first to fifth horizontal beams are integrally formed as a second sub-vertical beam; another of the two fourth vertical beams disposed at another same side of the first to fifth horizontal beams is a third sub-vertical beam; and another of the two first vertical beams, another of the two second vertical beams and another of the two third vertical beams disposed at the another same side of the first to fifth horizontal beams are integrally formed as a fourth integrated vertical beam;

the first sub-vertical beam is detachably connected to the second sub-vertical beam, and the third sub-vertical beam is detachably connected to the fourth sub-vertical beam;

the first to fifth horizontal beams are aluminum extruded horizontal beams, and all first to fourth vertical beams are aluminum extruded vertical beams.

12. The display apparatus according to claim 1, further comprising:
at least one first interface disposed on at least one of the first to fifth horizontal beams;
at least one second interface disposed on at least one of all first to fourth vertical beams; and
at least one button disposed on at least one of all the first to fourth vertical beams.

13. The display apparatus according to claim 1, further comprising:
a second cover plate disposed on a back of the first display screen and fixed on the frame;
a third cover plate disposed on a back of the second display screen and fixed on the frame; and
at least one third interface disposed on the third cover plate.

14. A display apparatus, comprising:
a frame, the frame including at least one base assembly and a frame body fixed on the at least one base assembly;
a first display screen fixed within the frame body; and
a second display screen fixed within the frame body, wherein
the first display screen and the second display screen are arranged along a first direction; wherein
the frame body includes:
a connecting portion detachably fixed to the at least one base assembly; wherein the connecting portion includes two first vertical beams and a first horizontal beam connected to the two first vertical beams;
a first frame portion disposed on a side of the connecting portion away from the base assembly and connected to the connecting portion, wherein the first display screen is disposed within the first frame portion; the first frame portion includes two second vertical beams and a second horizontal beam connected to the two second vertical beams;

a second frame portion disposed on a side of the first frame portion away from the connecting portion and connected to the first frame portion, wherein the second display screen is disposed within the second frame portion; the second frame portion includes two third vertical beams, and a third horizontal beam and a fourth horizontal beam that are each connected to the two third vertical beams; and a third frame portion disposed on a side of the second frame portion away from the first frame portion and connected to the second frame portion; wherein the third frame portion includes two fourth vertical beams and a fifth horizontal beam connected to the two fourth vertical beams;

the first direction is a direction from the connecting portion to the third frame portion;

the first to fifth horizontal beams are sequentially arranged along the first direction, and all first to fourth vertical beams extend in the first direction;

at least one of the first to fifth horizontal beams is a second-type horizontal beam; the second-type horizontal beam includes a second horizontal beam body and at least one step groove, wherein the at least one step groove is disposed in at least one visible surface of the second horizontal beam body, and the at least one visible surface is parallel to display surfaces of the first display screen and the second display screen; and the frame body further includes:
at least one second magnetic part, each second magnetic part being disposed in a corresponding step groove; and
at least one second horizontal beam trim panel covering the at least one second magnetic part, wherein each second horizontal beam trim panel extends out of a corresponding step groove in the first direction.

15. The display apparatus according to claim 14, wherein the second horizontal beam, the third horizontal beam and the fourth horizontal beam are second-type horizontal beams;

a second horizontal beam trim panel disposed on the second horizontal beam extends beyond the second horizontal beam in a direction pointing to the fifth horizontal beam from the first horizontal beam, and the second horizontal beam trim panel disposed on the second horizontal beam seals a gap between the second horizontal beam and the first display screen; and/or a second horizontal beam trim panel disposed on the third horizontal beam extends beyond the third horizontal beam in a direction pointing to the fifth horizontal beam from the first horizontal beam, and the second horizontal beam trim panel disposed on the fifth horizontal beam seals a gap between the second display screen and the third horizontal beam; and/or the second horizontal beam trim panel disposed on the third horizontal beam extends beyond the third horizontal beam in a direction pointing to the first horizontal beam from the fifth horizontal beam, and the second horizontal beam trim panel disposed on the third horizontal beam seals a gap between the third horizontal beam and the first display screen; and/or a second horizontal beam trim panel disposed on the fourth horizontal beam extends beyond the fourth horizontal beam in a direction pointing to the first horizontal beam from the fifth horizontal beam, and the second horizontal beam trim panel disposed on the fourth horizontal beam seals a gap between the second display screen and the fourth horizontal beam.

16. A display apparatus, comprising:
a frame, the frame including at least one base assembly and a frame body fixed on the at least one base assembly;
a first display screen fixed within the frame body; and
a second display screen fixed within the frame body, wherein
the first display screen and the second display screen are arranged along a first direction; wherein
the frame body includes:
a connecting portion detachably fixed to the at least one base assembly; wherein the connecting portion includes two first vertical beams and a first horizontal beam connected to the two first vertical beams;
a first frame portion disposed on a side of the connecting portion away from the base assembly and connected to the connecting portion, wherein the first display screen is disposed within the first frame portion; the first frame portion includes two second vertical beams and a second horizontal beam connected to the two second vertical beams;
a second frame portion disposed on a side of the first frame portion away from the connecting portion and connected to the first frame portion, wherein the second display screen is disposed within the second frame portion; the second frame portion includes two third vertical beams, and a third horizontal beam and a fourth horizontal beam that are each connected to the two third vertical beams; and
a third frame portion disposed on a side of the second frame portion away from the first frame portion and connected to the second frame portion; wherein the third frame portion includes two fourth vertical beams and a fifth horizontal beam connected to the two fourth vertical beams;
the first direction is a direction from the connecting portion to the third frame portion;
the first to fifth horizontal beams are sequentially arranged along the first direction, and all first to fourth vertical beams extend in the first direction;
at least one of all first to fourth vertical beams is a first-type vertical beam, the first-type vertical beam includes a vertical beam body and at least one second functional groove disposed in the vertical beam body, the at least one second functional groove extends in the first direction; and
the frame body further includes:
at least one third magnetic part, each third magnetic part being disposed in a corresponding second functional groove; and
at least one vertical beam trim panel disposed on the vertical beam body and covering the at least one third magnetic part.

* * * * *